United States Patent
Ogasawara

(10) Patent No.: US 6,938,131 B2
(45) Date of Patent: Aug. 30, 2005

(54) METHOD, APPARATUS, PROGRAM AND RECORDING MEDIUM FOR MEMORY ACCESS SERIALIZATION AND LOCK MANAGEMENT

(75) Inventor: Takeshi Ogasawara, Hachioji (JP)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 10/413,850

(22) Filed: Apr. 15, 2003

(65) Prior Publication Data

US 2004/0148475 A1 Jul. 29, 2004

(30) Foreign Application Priority Data

Apr. 26, 2002 (JP) ........................................ 2002-125343

(51) Int. Cl.[7] ............................................. G06F 12/06
(52) U.S. Cl. ........................................................ 711/151
(58) Field of Search .............................. 711/150, 151, 711/152

(56) References Cited

U.S. PATENT DOCUMENTS

| | | | | |
|---|---|---|---|---|
| 5,968,135 A | * | 10/1999 | Teramoto et al. | 713/375 |
| 6,006,325 A | * | 12/1999 | Burger et al. | 712/214 |
| 6,466,988 B1 | * | 10/2002 | Sukegawa et al. | 709/248 |
| 6,594,736 B1 | * | 7/2003 | Parks | 711/151 |
| 6,708,269 B1 | * | 3/2004 | Tiruvallur et al. | 712/225 |

OTHER PUBLICATIONS

Bacon et al., "Thin Locks: Featherweight Synchronization for Java", IBM Research Center, 1998, pp. 258–268.

Hoare, "Monitors: An Operating System Structuring Concept", Communications of the ACM, vol. 17, No. 10, 1974, pp. 549–557.

* cited by examiner

Primary Examiner—Kevin L. Ellis
(74) Attorney, Agent, or Firm—McGinn & Gibb, PLLC; Derek S. Jennings

(57) ABSTRACT

To improve the processing speed in a case where a program requiring memory access serialization is executed in a multiprocessor environment with a load instruction out-of-order execution function.

Each of CPUs has the function of performing store forwarding (SF) when the address regions of a pair of store and load instructions coincide with each other. Each CPU stops SF and performs store forwarding avoidance (SFA) when the two address regions do not coincide with each other but have an overlap therebetween. Each of SF and SFA is executed with priority over out-of-order execution. Each CPU performs SFA effective in limiting out-of-order execution with respect to a predetermined store instruction on a program and a load instruction mated to the store instruction and given after the store instruction, and ensures that data relating to the store instruction can be observed from other CPUs.

27 Claims, 10 Drawing Sheets

[Figure 1]
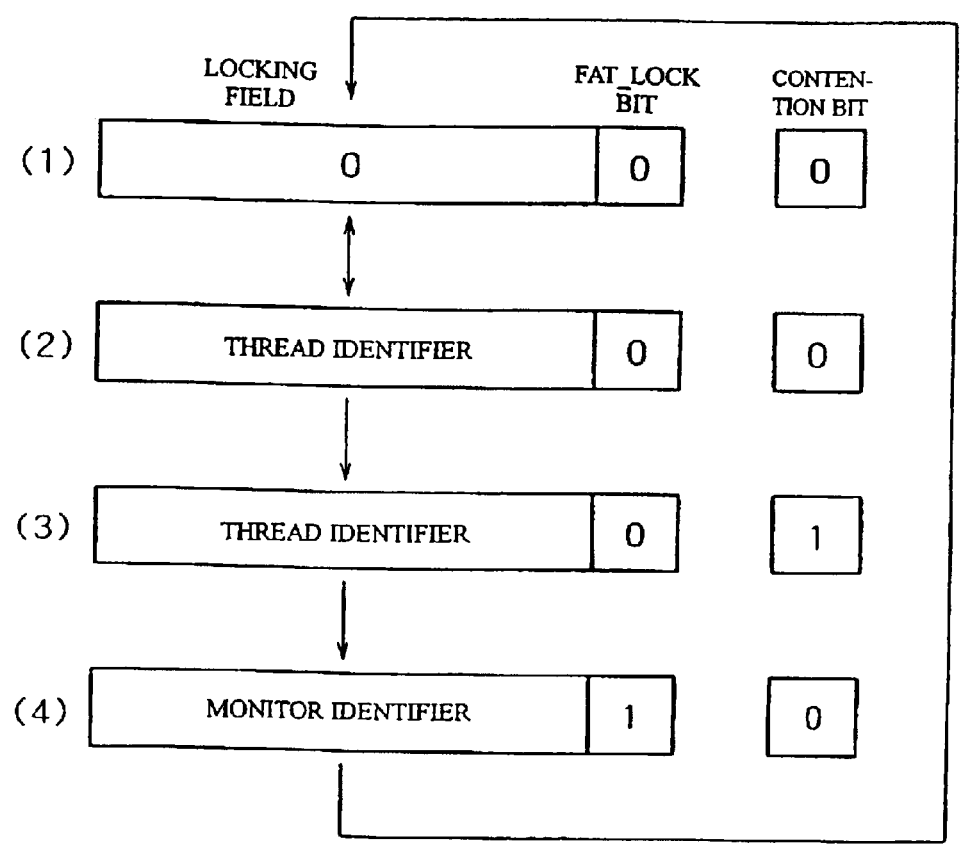

[Figure 2]
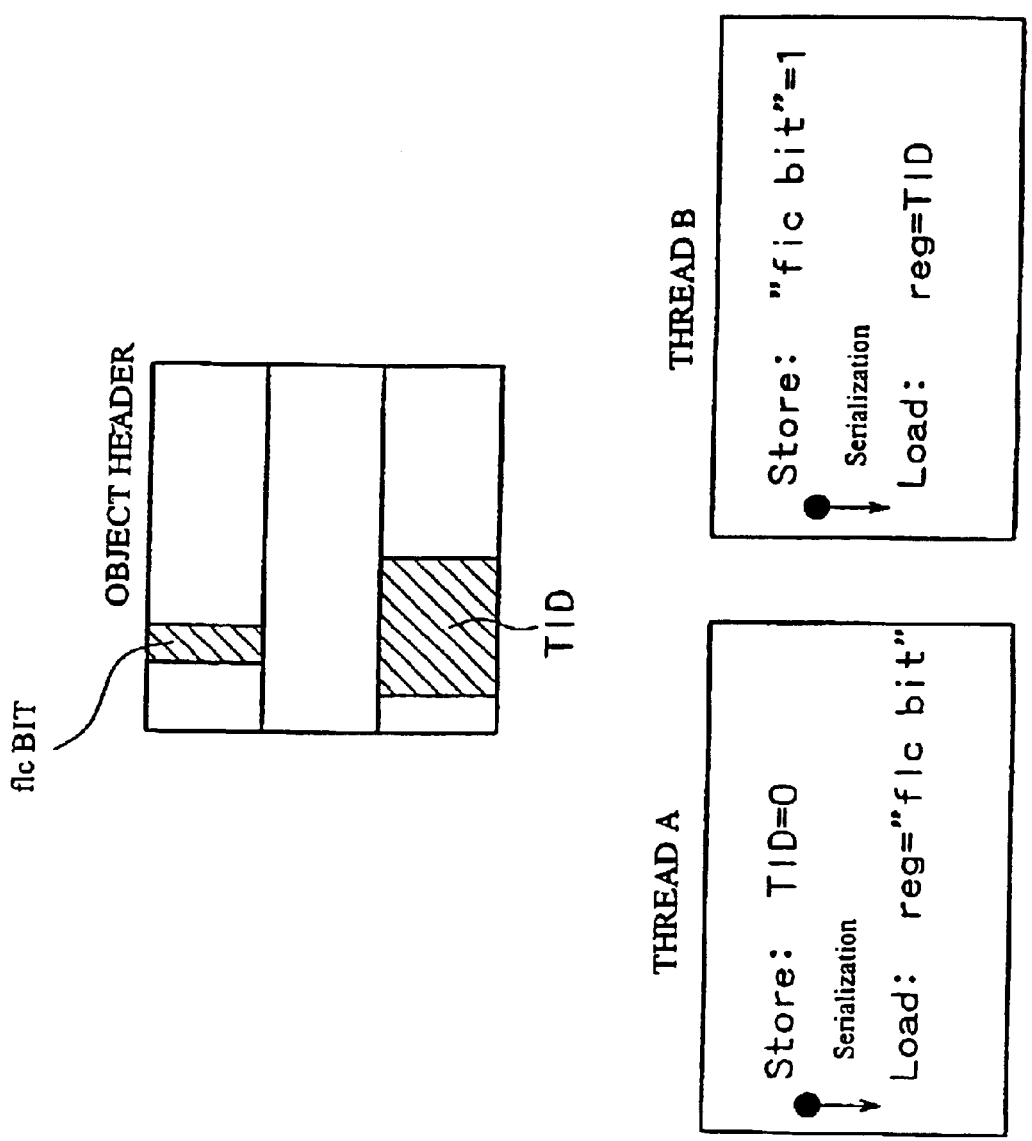

[Figure 3]
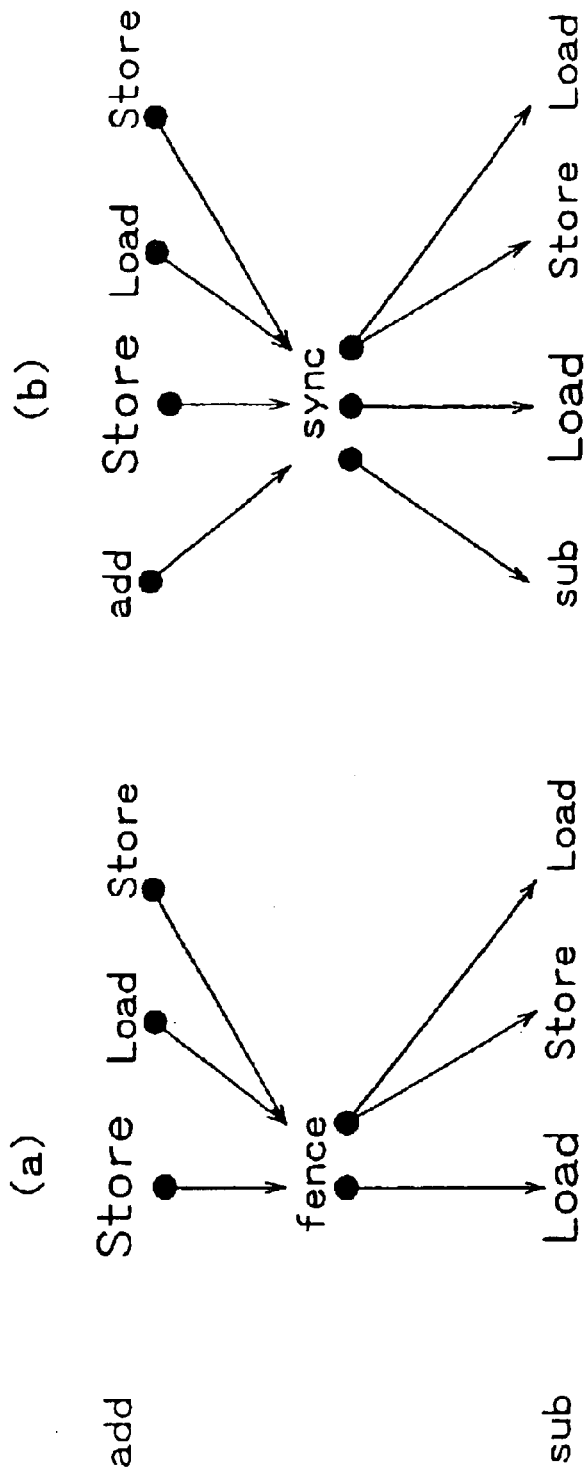

[Figure 4]
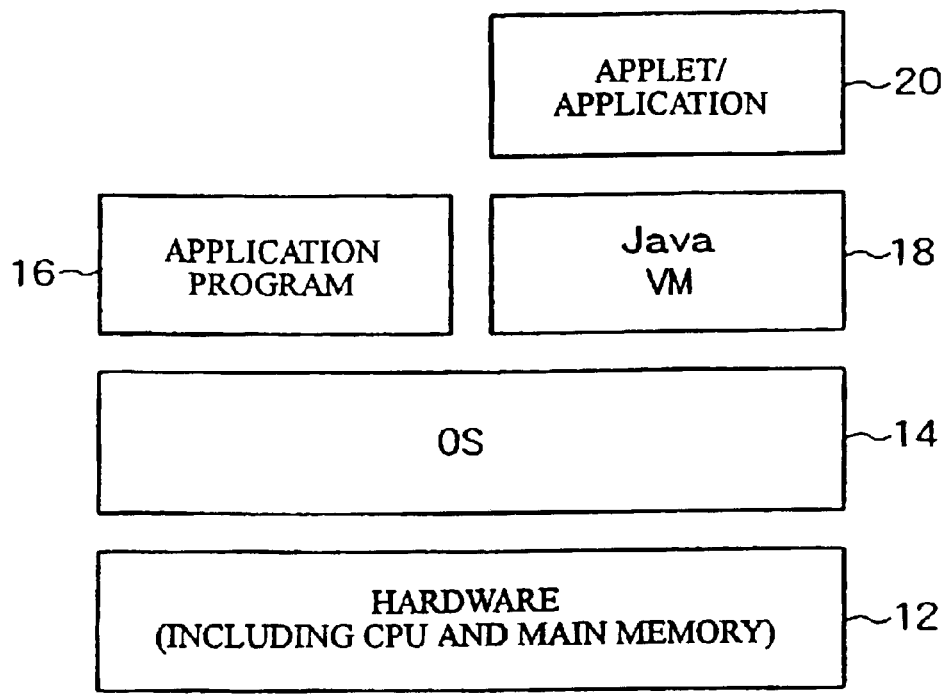
[Figure 5]
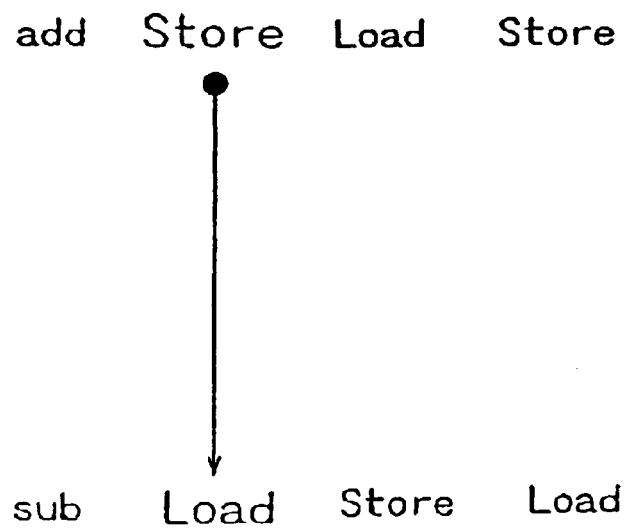

[Figure 6]
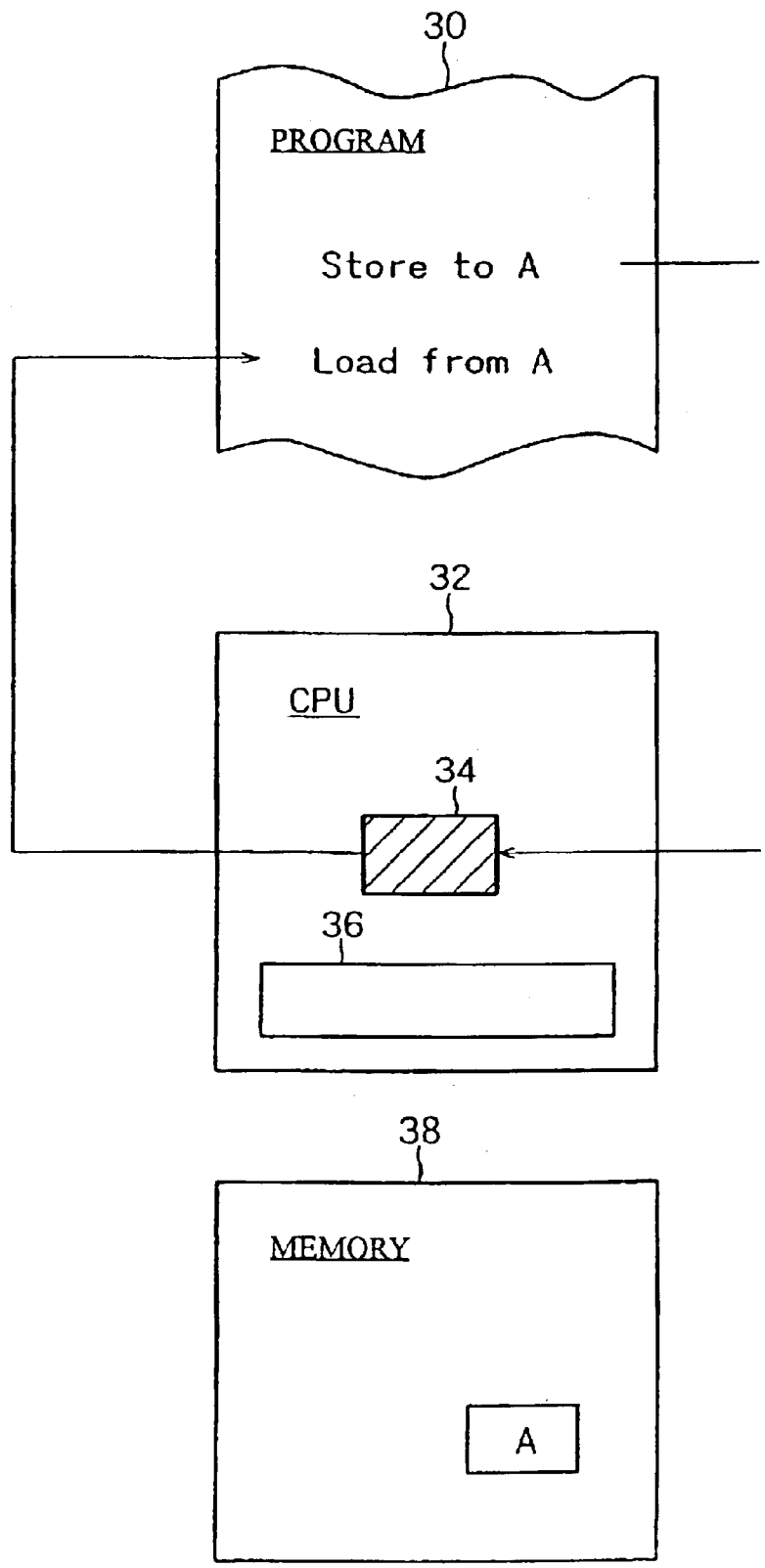

[Figure 7]
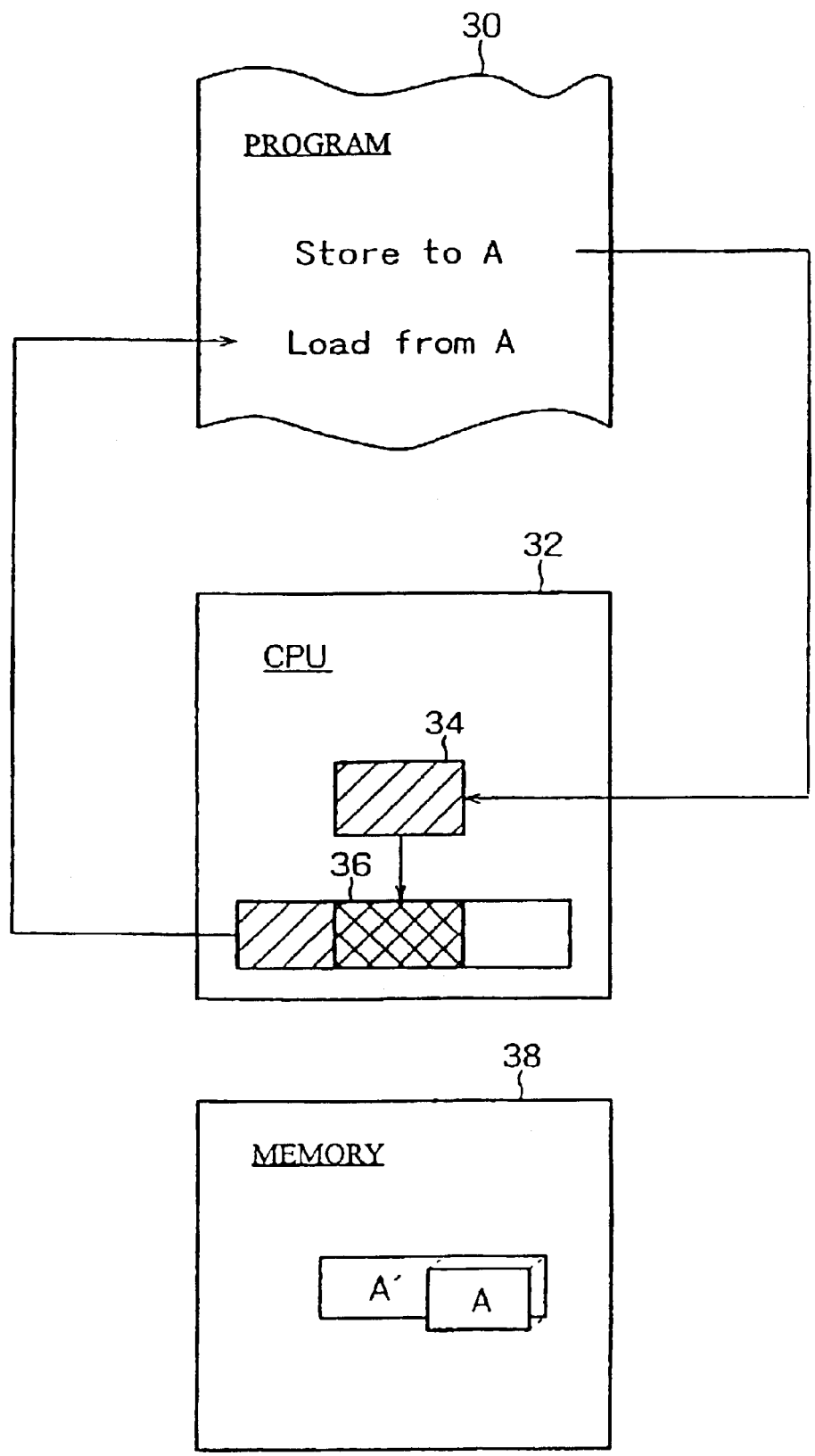

[Figure 8]
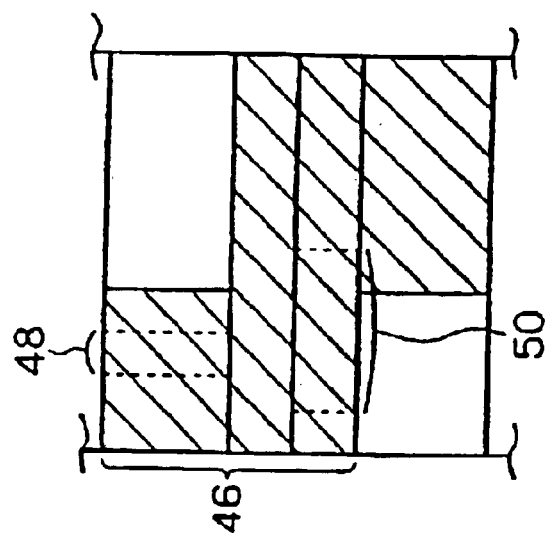
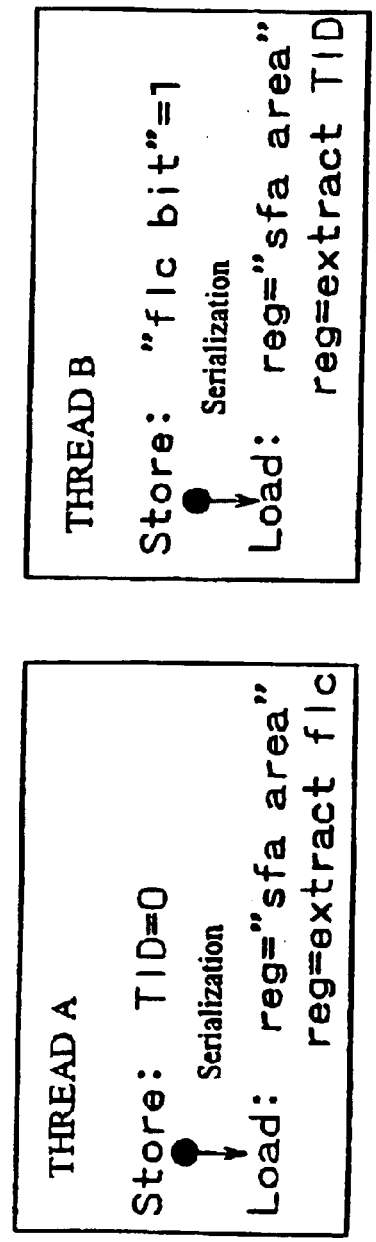

[Figure 9]
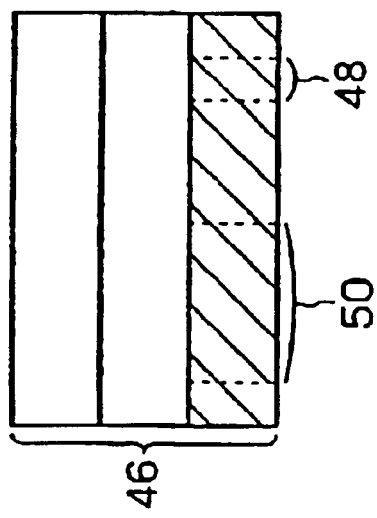

[Figure 10]
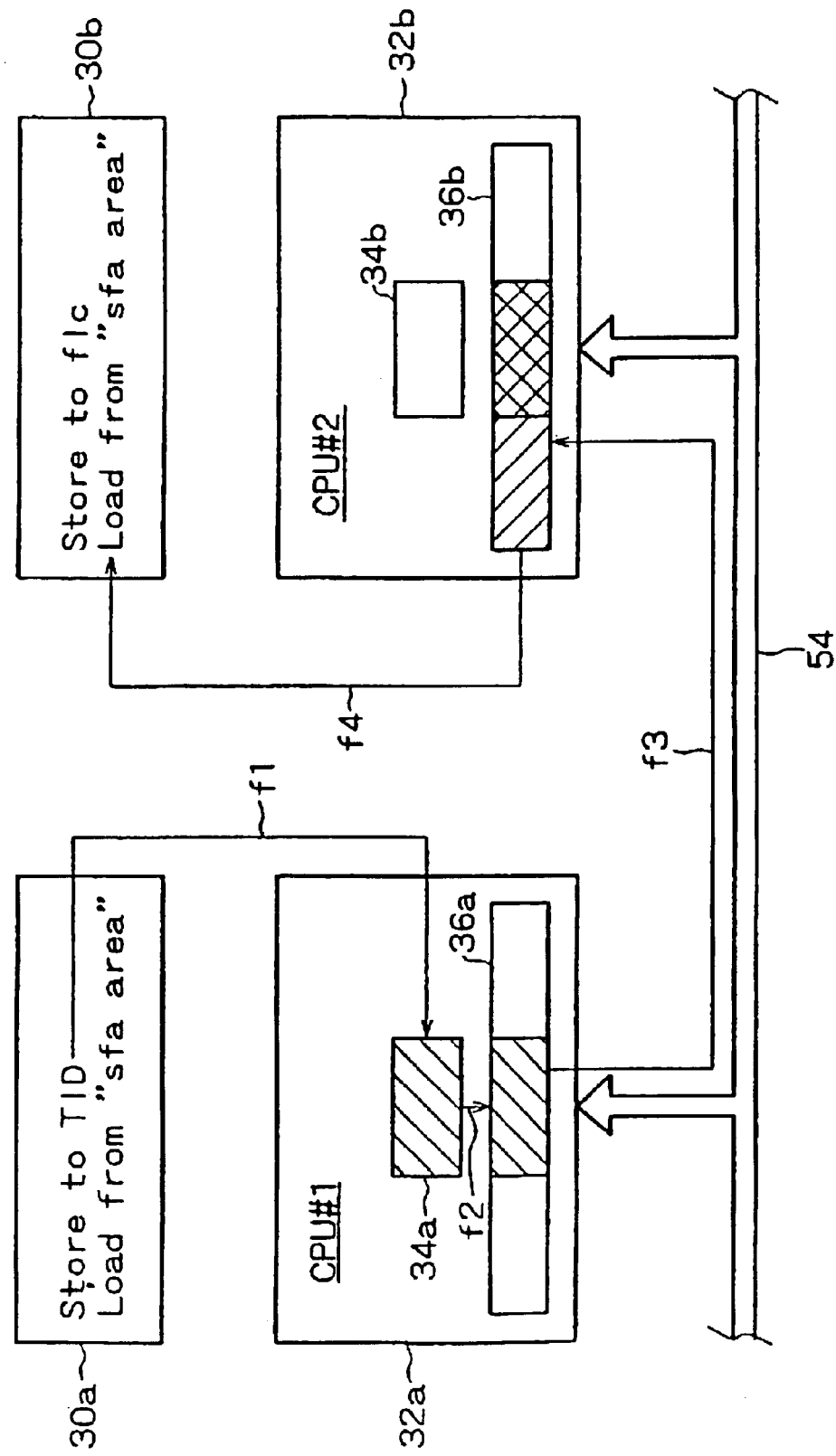

[Figure 11]
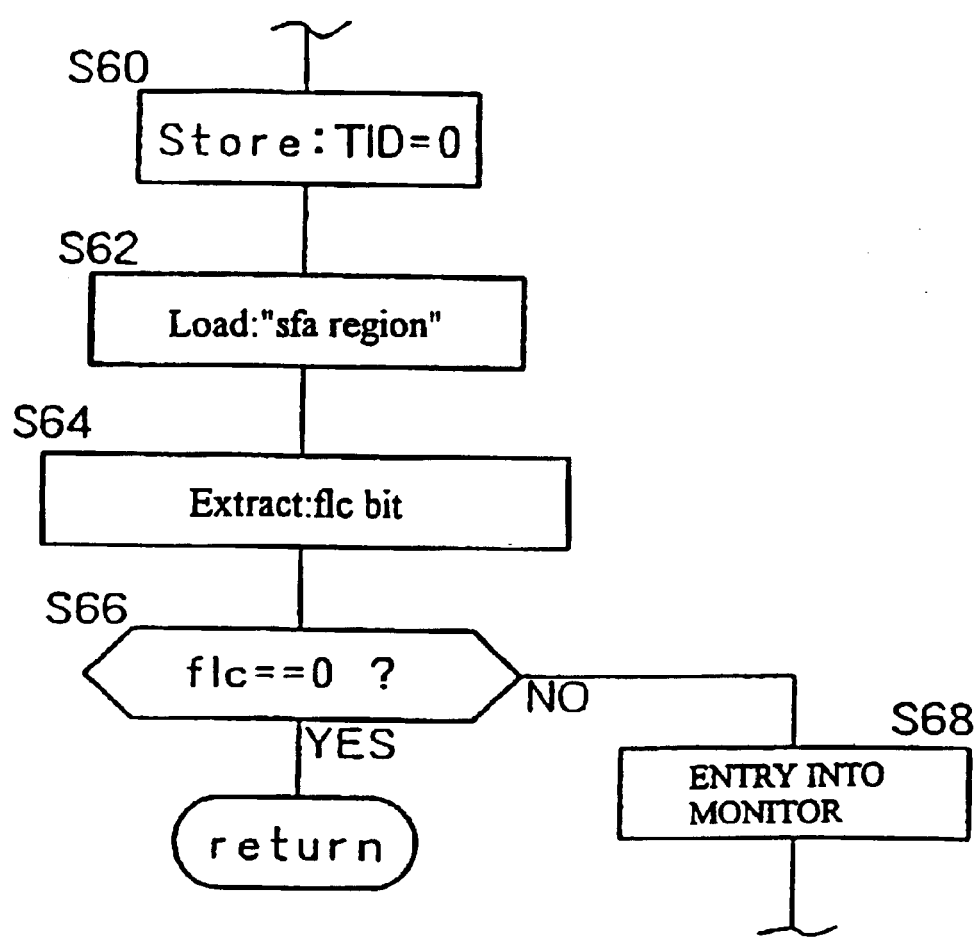

METHOD, APPARATUS, PROGRAM AND RECORDING MEDIUM FOR MEMORY ACCESS SERIALIZATION AND LOCK MANAGEMENT

DETAILED DESCRIPTION OF THE INVENTION

1. Field of the Invention

The present invention relates to a method, an apparatus, a program and a recording medium for memory access serialization and lock management and, more particularly, to a method, an apparatus, a program and a recording medium for performing memory access serialization and lock management so as to ensure the desired reliability with which store instructions and load instructions relating to memory access are serialized no matter what the load instruction out-of-order execution function of the CPU.

2. Background Art

Software for servers uses multiple threads for processing requests from a plurality of clients. In general, such thread-parallel software enables parallel processing using multiple processors, i.e., simultaneous execution of a number of processings. In multithread processing, updating of the same data through a plurality of threads can occur frequently. In such a situation, a synchronization mechanism may be used for ensuring data consistency. In Java® (a trademark of Sun Microsystems, Inc.) that is multithread-capable on language level, two kinds of synchronization mechanisms are supported: the synchronized method and the synchronized block. Today, many software programs for servers such as middleware are written in Java®. Therefore the performance of the two synchronization mechanisms in Java® greatly influences the performance of servers.

The applicant of the present invention proposed the tasuki lock as an algorithm for an improved synchronization mechanism in an object management system (Published Unexamined Patent Application No. 2000-76086). The tasuki lock is characterized in that spin-wait, which is a weak point in a thin lock, is eliminated while the advantage of the thin lock, i.e., the advantage that only one atomic instruction suffices, is maintained. The tasuki lock is the best algorithm among those presently conceivable, and Java® virtual machines in which the tasuki lock is implemented are well known.

The tasuki lock in an object management system will be described along with other lock methods. To synchronize operations for access to an object in a program in which a plurality of threads are operated, codes of the programs are formed in such a manner that the object is locked before access, access is then made, and the object unlocked after the access. As a method of implementation of this object locking, a spin lock and a queue lock are well known. A combination of these methods (hereinafter referred to as a composite lock) has also been proposed.

(1) Spin Lock

A spin lock is a lock method in which the state of a lock is managed by storing identifiers for threads executing locking on an object in correspondence with the object. In the spin lock, when a thread T fails to acquire a lock on an object o, that is, if another thread S has already locked the object o, locking is repeatedly attempted until success is attained in locking. Typically, locking or unlocking is performed as described below by using an atomic machine instruction such as compare_and_swap.

TABLE 1

```
10 /* lock */
20 while (compare_and_swap(&o->lock, 0, thread_id ( ))= =0)
30    yield( );
40 /* access to o */
   . . .
50 /* unlock*/
60 o->lock=0;
```

Referring to Table 1, locking is performed at the twentieth and thirtieth lines. Yield( ) is effected until a lock is acquired. Yield( ) comprises stopping the execution of the current thread and handing over control to the scheduler. Ordinarily, the scheduler selects one of the other executable threads and makes the selected thread run. Thereafter, the scheduler again makes the preceding thread run, and the execution of the while statement is repeated until success is attained in lock acquisition. In the case where "yield" exists, not only wasting of CPU resources but also a dependence of the implementation on the scheduling method in the platform cannot be avoided and, therefore, it is difficult to write a program so that the program operates as expected. The condition compare_and_swap in the while statement at the twentieth line is such that the content of the field o->lock prepared for the object o and 0 is compared and, if the result of comparison is true, the ID (thread_id( )) of the thread is written to the field. The state where 0 is stored in the field prepared for the object o indicates that there is no thread locking the object. Therefore, when unlocking is performed at the sixtieth line, 0 is stored in o->lock. This field is, for example, a filed of one word for, but may have any number of bits sufficient for storing the identifier of the thread.

(2) Queue Lock

A queue lock is a lock method in which threads executing access to an object are managed by using a queue. In the queue lock, when a thread T fails to lock an object o, it suspends by setting itself in a queue of the object o. An unlocking code includes a code for checking whether or not the queue is empty. If the queue is not empty, one thread is taken out from the queue and is resumed. Such a queue lock is implemented integrally with the scheduling mechanism of an operating system (OS) and is provided as an application programming interface (API) of the OS. Semaphore and Mutex are a typical example of a means for such a queue lock. In a queue lock, one word does not suffice as a space overhead. Ordinary, several ten kilobytes are required for a space overhead. It is also to be noted that some lock is acquired or released in a locking or unlocking function since the queue, which is a common resource, is operated.

(3) Composite Lock

A multithread-compatible program is written so that access to a common resource is protected with a lock, by considering execution by multiple threads. However, a case is conceivable in which a multithread-compatible library is used by a single-thread program. A case is also possible in which the occurrence of lock contention is substantially zero even at the time of execution by multiple threads. In fact, a report according to an execution record of Java® (a trademark of Sun Microsystems, Inc.) says that there have been substantially no instances of contention in access to objects in many applications.

Therefore "locking an unlocked object, obtaining access, and unlocking the object" is considered a path executed with increased frequency. This path is executed with markedly high efficiently in the case of a spin lock, but is executed with low efficiency both in terms of time and in terms of space in the case of a queue lock. On the other hand, a CPU resource is wastefully consumed in the case of a spin lock when contention occurs actually, although the frequency of contention is low. There is no such problem with a queue lock.

The basic idea of a composite lock resides in using a suitable combination of a lock using simple processing such as spin lock (referred to as "thin lock") and a lock using complicated processing such as a queue lock (referred to as "fat lock") to execute the above-described high-frequency path while maintaining the efficiency at the time of contention. More specifically, locking by a thin lock is first attempted, a transition to locking by a fat lock is made if contention occurs when locking by the thin lock is attempted, and the fat lock is thereafter used.

This composite lock has a field for locking in an object, as does a spin lock. The value of a "thread identifier" or a "fat lock identifier" and a Boolean value indicating which one of the thread identifier value and the fat lock identifier value is stored are stored in the field.

The procedure of locking is as described below.

1) Thin lock acquisition is attempted by an atomic instruction (e.g., compare_and_swap). If success is attained in acquiring the thin lock, access to the object is executed. In the case of failure, it can be found that transition to the fat lock has already been made, or that the thin lock is being maintained by some other thread.

2) If transition to the fat lock has already been made, the fat lock is acquired.

3) In a case where contention occurs in locking by the thin lock, the thin lock is acquired, transition to the fat lock is made and the fat lock is acquired (executed by an inflate function according to a description made below).

The composite lock is implemented in one of two ways according to whether or not yield is effected in "acquisition of thin lock" in the procedure 3, as described below in detail. It is assumed here that the field for locking is one word and, for further simplification, that "thread identifier" or "fat lock identifier" is always an even number other than 0; "thread identifier" is stored if the least significant bit in the locking field is 0; and "fat lock identifier" is stored if the least significant bit in the locking field is 1.

Example 1 of Composite Lock

A case of the composite lock in which yield is effected in "acquisition of thin lock". A locking function can be written in accordance with the above-described procedure, as shown below.

TABLE 2

```
10 :void lock(o) {
20 :     if (compare_and_swap(&o->lock, 0, thread_id( ))
30 :         return;
40 :     while (! (o->lock & FAT_LOCK)) {
50 :         yield( );
60 :         if (compare_and_swap (&o->lock, 0, thread_id( ))){
70 :             inflate(o);
80 :             return;
90 :         }
100:     }
110:     fat_lock(o->lock)
120:     return;
```

TABLE 2-continued

```
130: }
150: void unlock (o){
160:    If (o->lock= =thread_id( ))
170:        o->lock=0;
180:    else
190:        fat_unlock(o->lock);
200: }
220: void inflate(o){
230:    o->lock=alloc_fat_lock( ) | FAT_LOCK;
240:    fat_lock(o->lock);
250: }
```

In Table 2, pseudo codes at the lines 10 to 130 represent a locking function, pseudo codes at the lines 150 to 200 represent an unlocking function, and pseudo codes at the lines 220 to 250 represent an inflate function used in the locking function. In the locking function, locking by the thin lock is attempted at the line 20. If the lock is acquired, access to the object is executed. Unlocking with respect to a thread identifier input at the line 160 to the field for locking of the object is performed by inputting 0 to the field at the line 170. Thus, the high-frequency path can be executed at a high speed as in the case of a spin lock. On the other hand, if the lock cannot be acquired at the line 20, a determination is made at the line 40 as to whether a condition defined by a while statement, i.e., the result of bit-by-bit AND operation on the FAT_LOCK bit, which is the least significant bit of the locking field, and the bits in the locking field, is zero, that is, whether the FAT_LOCK bit is zero (more specifically, whether locking by the thin lock is designated). If this condition is satisfied, yield is effected until the thin lock is acquired at the line 60. When the thin lock is acquired, the inflate function from the line 220 is executed. In the inflate function, a fat lock identifier and the logical value 1 FAT_LOCK bit are input to the locking field o->lock (line 230). The fat lock is then acquired (line 240). If the FAT_LOCK bit is already 1 at the line 40, the fat lock is immediately acquired (line 110). Unlocking of the fat lock is performed at the line 190. Acquisition and unlocking of the fat lock are not particularly specified in the present invention and, therefore, will not be described.

It is to be noted here that only the thread maintaining the thin lock rewrites the locking field. The same can be said with respect to unlocking. Yield occurs only at the time of contention for the thin lock.

Example 2 of Composite Lock

Another example of the composite lock without yield in acquisition of the thin lock will be described. A wait is required in the case of contention in attempting locking by the thin lock. When the thin lock is released, it is necessary to notify the waiting thread of the release of the thin lock. For this wait and notification, a condition variable, a monitor or Semaphore is required. A description will be made below with respect to a case of using a monitor.

TABLE 3

```
10 :void lock (o) {
20 :    if (compare_and_swap (&o->lock, 0, thread_id( ))
30 :        return; 40 : monitor_enter (o);
50 :    while (! (o->lock, & FAT_LOCK)){
60 :        if (compare_and_swap(&o->lock, 0, thread_id( )){
70 :            inflate(o);
80 :            monitor_exit(o);
```

TABLE 3-continued

```
 90 :            return;
100:          } else
110:              monitor_wait(o);
120:        }
130:        monitor_exit(o);
140:        fat_lock(o->lock);
150:        return;
160: }
180: void unlock (o) {
190:      if (o->lock = = thread_id( )) {
200:          o->lock=0;
210:          monitor_enter(o);
220:          monitor_notify(o);
230:          monitor_exit(o);
240:      } else
250:          fat_unlock(o->lock);
260: }
280: void inflate (o) {
290:      o->lock = alloc_fat_lock( ) | FAT_LOCK
300:      fat_lock(o->lock);
310:      monitor_notify_all(o);
320: }
```

The monitor is a sync mechanism devised by Hoare to enable exclusive control of access to an object (enter and exit), a waiting operation of a thread when a predetermined condition is satisfied (wait), an operation for notifying the waiting thread (notify and notify_all) (see Hoare, C. A. R. Monitors: An operating system structuring concept. Communications of ACM 17, 10 (October 1974), 549–557). One thread at most is permitted to enter the monitor. When a thread T is about to enter a monitor m, it is made to wait if some other thread S has already entered. The thread T waits at least before the thread S exits from the monitor m. Exclusive control is thus performed. The thread T having entered the monitor m can wait at the monitor m for a situation in which a certain condition is satisfied. More specifically, the thread T implicitly exits from the monitor m and suspends. It is to be noted here that after the thread T has implicitly exited from the monitor m, another thread can enter the monitor m. On the other hand, the thread S having its entry in the monitor m can give a notice to the monitor m of the entry after satisfying a certain condition. Then, for example, one thread U in threads waiting at the monitor m is waked up. The thread U resumes thereby and attempts to implicitly enter the monitor m. It is to be noted that since the thread A has its entry in the monitor m, the thread U is made to wait at least before the thread S exits from the monitor m. If there is no thread waiting a the monitor m, nothing happens. Instruction "notify_all" is the same as "notify" except for waking up all of waiting threads.

Referring to Table 3, the lines 10 to 160 represent a locking function, the lines 180 to 260 represent an unlocking function, and the lines 280 to 320 represent an inflate function. The difference from the composite lock example 1 with respect to the locking function resides in entering the monitor at the line 40, waiting without effecting yield in the case of contention for the thin lock (line 110), and exiting from the monitor when transition to the fat lock is made (line 80) and when transition to the fat lock is confirmed. It is to be noted here that an exit from the monitor is made at the line 130 and the fat lock is acquired at the line 140.

The difference from the composite lock example 1 with respect to the unlocking function resides in processing for entering the monitor at the lines 210 to 230, giving a notice to the monitor, and exiting from the monitor. This is because yield is not effected and waiting at the monitor is performed instead of yield. In the inflate function, notify_all is added. This is also because yield is not effected and waiting at the monitor is performed instead of yield. The line 290 represents an OR operation on the fat lock identifier obtained by alloc_fat_lock( ) and FAT_LOCK bit set to a logical value 1, and an operation for inputting the result of the OR operation.

Referring to Table 3, while yield is removed, an operation for notification (notify) is provided since there is a possibility of existence of a thread waiting at the time of unlocking, resulting in a reduction in the performance of the high-frequency path. Also, for spatial efficiency, the monitor or an additional function equivalent to the monitor is required. However, the monitor or the additional function become unnecessary after transition to the fat lock. In other words, it is necessary to separately prepare the monitor and the fat lock.

Example 3 of Composite Lock

This example of the composite lock, unlike Example 1, does not have the fat lock and the monitor separately provided. In this example, FAT_LOCK bit indicates transition to the fat lock and, after entry in the monitor, processing is performed by assuming that the fat lock has been acquired. See, for example, David F. Bacon, Ravi Konuru, Chet Murthy, and Mauricio Serrano. Thin Locks: Featherweight Synchronization for Java®. Proceedings of the SIGPLAN '98 Conference on Programming Language Design and Implementation (1998), pp. 258–268. According to this thesis, yield is effected.

The tasuki lock disclosed below is a composite method which does not reduce the high-frequency-path processing speed, which does not use,yield and does not separately prepare a fat lock and a monitor, in which the FAT_LOCK bit indicates transition to the fat lock, and which enables processing after an entry into the monitor by assuming that the fat lock has been acquired. While no consideration is given to transition from the fat lock to the thin lock with respect to the composite locks shown in Tables 2 and 3, the tasuki lock described below enables transition from the fat lock to the thin lock.

In the tasuki lock, a contention bit for prevention of a reduction in the high-frequency-path processing speed is newly introduced. As shown in FIG. 1, 0 is stored in each of a locking field and the contention bit in a case where no thread locking an object exists (case (1)). Thereafter, when a thread locks the object (by the thin lock), the identifier of the thread is stored in the locking field (case (2)). If no other thread attempts to lock the object before the thread designated by this thread identifier unlocks the object, the state (1) occurs again. If some other thread attempts to lock the object before unlocking, contention for the thin lock occurs and the contention bit is set to record this contention (case (3)). Thereafter, when transition to the fat lock is made, the contention bit is cleared (case (4)). The bit indicating the thin lock mode or the fat lock mode (FAT_LOCK bit) may be set as the most significant bit in the locking field instead of being set as the least significant bit.

Processing for the tasuki lock using the above-described contention bit and locking field will be described.

TABLE 4

```
10 : void lock (Object* o) {
20 :    /* thin lock */
30 :    if (compare_and_swap (&o->lock, 0, thread_id( )))
```

TABLE 4-continued

```
 40 :      return;
 50 :   /* fat lock and mode transition path */
 60 :   MonitorId mon=obtain_monitor(o);
 70 :   monitor_enter(mon);
 80 :   /* mode transition loop */
 90 :   while (o->lock & FAT_LOCK) = =0) {
100:      set_flc_bit(o);
110:      if (compare_and_swap (&o->lock, 0, thread_id( )))
120:         inflate (o, mon);
130:      else
140:         monitor_wait (mon);
150:   }
160:
170: }
180:
190: void unlock (Object* o) {
200:   /* thin lock path */
210:   if ((o->lock & FAT_LOCK) = =0)
220:      o->lock=0;
230:      if (test_flc_bit(o)) { /* overhead of the present
invention */
240:         MonitorId mon=obtain_monitor(o);
250:         monitor_enter(mon);
260:         if (test_flc_bit(o))
270:            monitor_notify(mon);
280:         monitor_exit(mon);
290:      }
300:      return;
310:   }
320:   /* fat lock path */
330:   x=o->lock
340:      if (there is no thread waiting at the monitor with
respect to o)
350:      if (a predetermined condition is satisfied)
360:         o->lock=0; /* transition from fat lock to thin lock
*/
370:      monitor_exit ( x & ~FAT_LOCK );
380: }
390:
400:
410: void inflate (Object* o, MonitorId mon) {
420:   clear_flc_bit;
430:   monitor_notify_all (mon);
440:   o->lock= (Word) mon | FAT_LOCK;
450: }
460:
470:
480: MonitorId obtain_monitor(Object* o) {
490:   Word word=o->lock;
500:   MonitorId mon;
510:   if (word & FAT_LOCK)
520:      mon = word & ~FAT_LOCK;
530:   else
540:      mon = lookup_monitor(o);
550:   return mon;
560: }
```

The contention bit introduced into the tasuki lock is shown as flc_bit in Table 4. The contents of Table 4 will be described in detail. Table 4 is divided into four major sections: a section corresponding to a locking function (lines 10 to 170), a section corresponding to an unlocking function (lines 190 to 380), a section corresponding to an inflate function for transition from the thin lock to the fat lock (lines 410 to 450), and a section corresponding to a function obtain_monitor for obtaining the identifier of the monitor (lines 480 to 560).

(1) Locking Function:

In processing for the locking function starting from the line 10 with respect to the object o, acquisition of the thin lock is attempted (line 30). For this thin lock acquisition, an atomic instruction, e.g., compare_and_swap is used. This instruction is such that if a first argument and a second argument are the same value, a third argument is stored. More specifically, if o->lock which is the locking filed for the object o is equal to 0, the thread identifier is obtained by thread_id( ) and stored in the locking field o->lock, thereby making transition from (1) to (2) of FIG. 1. Then, to perform the necessary processing, a return is made (line 40). If the object o locking field o->lock is not equal to 0, thin lock acquisition ends in failure and transition to the line 60 is made. The processing to this step is the same as that of the codes shown in Table 3.

Next, the value of the obtain_monitor (o) for obtaining the identifier of the monitor is substituted in a variable "mon" (line 60) and a thread attempts to make a transition to a state under exclusive control performed by the monitor. That is, the thread attempts to enter the monitor (line 70). If the threads succeeds in making transition to a state under exclusive control, processing described below is performed. In the case of failure, the thread waits until it succeeds in making this transition. Subsequently, determination as to a condition defined by a while statement. That is, the result of bit-by-bit AND operation on the locking field o->lock and the FAT_LOCK bit is performed to make a determination as to whether the FAT_LOCK bit is 1 (line 90). In this processing, determination is made as to whether transition to the fat lock has been made or the thin lock is on. If the FAT_LOCK bit is not 1 (the thin lock is on), the result of this computation is 0 and processing after the while statement is performed. If the FAT_LOCK bit is 1 (the fat lock is on), the processing from the while statement is not performed and the state under the monitor after entry is maintained. Thus, success in entering the monitor when the FAT_LOCK bit is 1 means that the fat lock has been obtained in the tasuki lock. In this case, the thread performs processing on the object without exiting from the monitor (i.e., exiting from the state under exclusive control).

If it is determined at the line 90 that the FAT_LOCK bit is not 1, flc_bit is set (line 100, set_flc_bit(o)) since this determination result means occurrence of contention for the thin lock. Transition from (2) to (3) of FIG. 1 is thereby made. Then, determination is again made as to whether the thin clock can be obtained (line 110). If the thin lock cannot be obtained, processing is performed for transition from the thin lock to the fat lock by the inflate function (line 120). If the thin lock cannot be obtained, transition to a state of waiting at the, monitor is made (line 140). Transition to the state of waiting at the monitor comprises exiting from the monitor and suspending, as described above in the description of the monitor. Thus, when contention for the thin lock occurs, the contention bit flc_bit is set and transition to the state of waiting at the monitor is made if the thin lock cannot be obtained. The thread having entered the waiting state receives a notice (notify or notify_all) at the time of processing by the inflate function or unlocking.

(2) Inflate Function:

Processing by the inflate function at the lines 410 to 450 will be described. In this processing, the contention bit is cleared (line 420, clear_flc_bit), and a monitor notification operation (monitor_notify_all) is performed (line 430). In this processing, a notification is made such that all of threads in the waiting state are waked up. The result of bit-by-bit OR operation on the variable "mon" in which the monitor identifier is stored and the set FAT_LOCK bit is stored in the locking field o->lock (line 440, mon|FAT_LOCK). That is, transition from (3) to (4) of FIG. 1 is made. Transition from the thin lock to the fat lock is thereby completed. After the completion of processing at the line 120, the condition defined by the while statement is again checked. In this case, since the FAT_LOCK bit has already been set to 1, an exit is made from the while statement and the state under the monitor after entry is maintained. That is, processing in the while statement is not executed.

All the threads having received the notification implicitly attempt to enter the monitor at the line 140, but wait before entering the monitor. This is because the thread that has made notification does not exit from the monitor before unlocking is performed.

(3) Unlocking Function:

Processing by the unlocking at the lines 190 to 380 function will be described. By the unlocking function, unlocking of the thin lock and unlocking of the fat lock are performed. For unlocking of the fat lock, transition from (4) to (1) of FIG. 1 is made.

(3-1) Unlocking of Thin Lock:

To unlock the thin lock, bit-by-bit AND operation on the locking field o->lock and the FAT_LOCK bit is first performed and determination as to whether or not the value obtained by this operation is 0 (line 210). This processing is the same as the condition defined by the while statement at the line 90 and is performed to determine when the thin lock is on. If the thin lock is on, 0 is stored in o->lock (line 220). The fact that there is no thread holding the lock is thereby recorded. Determination is then made as to whether or not the contention bit is set (line 230, test_flc_bit). Even if no contention for the thin lock has occurred, it is necessary to execute at least the line 230. Thus, the only one overhead for the high-frequency path in the tasuki lock is the line 230. If the contention bit is not set, unlocking processing is terminated without performing any other processing (line 300).

If the contention bit is set, the monitor identifier is stored in the variable "mon" (line 240), as at the lines 60 and 70, and a thread attempts to enter the monitor identified with the monitor identifier (line 250). That is, the thread attempts to enter the state under exclusive control performed by the monitor. If the thread enters the monitor, determination is again made as to whether the contention bit is set (line 260). If the contention bit is set, one of the threads in the state of waiting at the monitor is notified of wake-up (line 270, monitor_notify(mon)). In the case of failure to enter the monitor, the thread attempting to enter the monitor waits until it becomes able to enter. The thread that has made the notification exits from the state under exclusive control performed by the monitor (line 280, monitor-exit(mon)).

The thread receiving the notification at the line 270 implicitly enters the monitor at the line 140. The process then returns to the line 80 and processing at the line is performed. Ordinarily, the thread receiving the notification at the line 270 enters the state under exclusive control performed by the monitor after the thread that has made the notice has exited from the state under exclusive control performed by the monitor and obtains the thin lock after setting of the contention bit. Processing by the inflate function is then performed to make transition to the fat lock.

(3-2) Unlocking of Fat Lock:

If it is found at the line 210 that the FAT_LOCK bit is 1, the process moves to the line 330. At the line 330, the contents of the locking field are stored in a variable x, and determination is made as to whether there is any other thread in the state of waiting at the monitor (line 340). If no thread in the waiting state exists, determination is made as to whether a predetermined condition is satisfied (line 350). If a situation should be considered where it is desirable to avoid exiting from the fat lock, a condition for avoiding exiting from the fat lock in such a situation is set as the predetermined condition. This step, however, may be omitted. If the predetermined condition is satisfied, the locking field o->lock is set to 0 (line 360). That is, information indicating that there is no thread holding the lock is stored in the locking field. An exit is then made from the monitor identified with the monitor identifier stored in the portion of the variable x other than the FAT_LOCK bit (line 370). In the line 370, x & ~FAT_LOCK is the bit-by-bit AND of the inverted FAT_LOCK bit and x. The thread waiting to enter the monitor is thereby enabled to enter the monitor.

(4) Function Obtain_Monitor for Obtaining Monitor Identifier:

In this function, the contents of the locking field are stored in a variable "word" (line 490). The variable "mon" for storing the monitor identifier is prepared (line 500) and determination Is made as to whether the FAT_LOCK bit is 1 (line 510, word & FAT_LOCK). If the FAT_LOCK bit is 1, the portion of the variable "word" other than the FAT_LOCK bit is stored in the variable "mon" (line 520, word & ~FAT_LOCK). If the FAT_LOCK bit is not 1, a function lookup_monitor(o) is executed (line 530). This function is used on the assumption that it has a hash table in which the relationship between objects and monitors is recorded, although the existence of such a table is not indicated in Table 4. Basically, this table is searched with respect to the object o to obtain the identifier of the monitor. If necessary, a monitor is generated, the identifier of the monitor is stored in the hash table, and the monitor identifier is thereafter returned. In either case, the identifier of the monitor stored in the variable "mon" is returned.

The composite lock shown in Table 4 differs largely from that shown in Table 3 in that the contention bit is introduced, that no processing exists between the line 150 and the line 170, and that transition from the fat lock to the thin lock at the lines 320 to 370 exists. Introduction of the contention bit necessitates checking at the line 230, but a large penalty is imposed as shown in Table 3 if the contention bit is not introduced. Also, since acquisition of the fat lock is recognized when the FAT_LOCK bit is 1 and when transition to the state under exclusive control performed by the monitor is made, the need for preparing a fat lock mechanism other than the monitor is eliminated and processing for an exit from the state under exclusive control performed by the monitor and acquisition of the fat lock is removed, thereby achieving an increase in processing speed. Also, transition from the fat lock to the thin lock (from (4) to (1) of FIG. 1) is provided to enable return to a state where the high-frequency path (transition between (1) and (2) of FIG. 1) can be executed with a small load.

There is no problem with setting the contention bit at the line 100 in Table 4 and checking the contention bit at the line 230, as described below. It should first be noted that "the contention bit is cleared only by the inflate function".

With respect to a situation where the thread T waits, the effect of enabling the thread T to be unfailingly notified will be described with respect to following two cases.

(1) A case where the inflate function is thereafter executed. When the inflate function is executed, notify_all is executed at the line 430. That is, the thread T is notified.

(2) A case where the inflate function is not executed. The thread T waits because of failure to acquire the thin lock at the line 110. At the point in time corresponding to failure at the line 110, another thread S is holding the thin lock. That is, the thread S is in a state before execution of the unlocking function at the line 220. Also, the contention bit set by the thread T before waiting is maintained in the set state due to the condition noted above, since the inflate function is not executed in this case. The thread S thereafter reaches the stage corresponding to the unlocking function at the line 220 and executes the next check of the contention bit. This check necessarily ends in success. That is, the thread T is notified by the thread S.

Also, transition from (4) to (1) of FIG. 1 is introduced. This is safe processing (1) because, while it is necessary for one thread to attain success in compare_and_swap in order to acquire the thin lock, success cannot be attained in compare_and_swap as long as some other thread is holding the fat lock, and the impossibility of acquiring the thin lock when the other thread is holding the fat lock is therefore ensured, and (2) because, while for acquisition of the fat lock by one thread it is necessary that the thread enter the monitor and that the condition defined by the while statement be not satisfied, the condition defined by the while statement is necessarily satisfied as long as some other thread is holding the fat lock and the impossibility of acquiring the thin lock when the other thread is holding the fat lock is therefore ensured, even though entry in the monitor is possible.

The tasuki lock is an improved algorithm, but it has been impossible to efficiently implement the tasuki lock in advanced CPUs. The cause of this impossibility resides in the memory access order required by the tasuki lock. The memory access order to be referred to as a tasuki constraint will be briefly described before the description of the cause. The tasuki lock requires the memory access order shown below to realize a starvation free characteristic. Unlocking of the tasuki lock is performed in the order of clearing the thread ID (TID field: thread identification field) and referring to the flat lock contention bit (flc bit). Also, the waiting operation after failure to secure the tasuki lock is performed in the order of setting the flc bit and referring to the TID field. Once operations are performed out of these store-load memory access orders, some of threads which require memory access will never be waked up.

There is a considerable problem with the tasuki constraint particularly in a multiprocessor environment where a CPU of an advanced architecture is used. An advanced CPU architecture with which a considerable tasuki lock problem exists is, for example, one in which the CPU changes the load-store order in an original program and uses out-of-order execution of a load operation outrunning a store operation. It is very important to conceal the load latency in program execution time, and out-of-order load greatly contributes to concealment of the apparent latency. Therefore almost all CPUs have a mechanism for such out-of-order execution of a load. In such CPUs in actual use, the tasuki constraint cannot be met even if programs are written so as to meet the tasuki constraint.

To meet the tasuki constraint, it is necessary to ensure particularly explicit serialization such that a load operation does not outrun a store operation. Presently existing instructions for explicit serialization are fence and sync (or instructions belonging to them). A fence instruction completes, before fence execution, all preceding memory access instructions preceding it on a program, and starts, after fence execution, all memory access instructions following it on the program. A sync instruction is similar to the fence instruction, but handles all instructions not limited to memory access instructions. For example, in the case of Intel Pentium® 4, there are three fence instructions: lfence, sfence, and mfence, and sync instructions include an instruction with a lock prefix, an I/O instruction, and a CPUID instruction. (Pentium® II or Pentium® III also has similar instructions.) Power PC has a sync instruction.

The tasuki constraint in the tasuki lock will be described with reference to FIG. 2. To execute the tasuki lock, an object header is provided in correspondence with each of objects. The object header is formed of three words (one word being formed of 32 bits). A contention bit, i.e., a flat lock contention (flc) bit, is placed in the first word of the object header, and a thread ID (TID) is placed in the third word of the object header. In a thread A, codes of a store instruction for releasing an object and a load instruction are written by being serialized. These store and load instructions correspond to the line 220 and the line 230 in Table 4. That is, the store instruction clears the TID, and the load instruction writes the value of the flc bit to a register. On the other hand, in a thread B, codes of a store instruction for locking an object and a load instruction are written by being serialized. These store and load instructions correspond to the line 100 and the line 110 in Table 4. That is, the store instruction clears the flc bit, and the load instruction writes the value of the TID to the register. The contents of the memory stored by each thread must be visible from other threads. Therefore it is necessary to strictly keep serialization of the store instruction and store buffer in each thread. In advanced CPU multiprocessor environments, however, to conceal the load instruction latency, out-of-order execution of instructions is made in such a manner that a load instruction is executed before a store instruction even though the load instruction follows the store instruction in the state of being serialized on the program. For example, in the thread B, the flc bit is set to make a transition from (2) to (3) of FIG. 1 with respect to the object o and processing after the transition is started. At this time, in the thread A, the flc bit of the object not set yet is read and unlocking processing to be performed under non-contending condition with respect to the object o is executed by determining that there is no contention, that is, unlocking processing is terminated when it is determined that there is no contention (return at the line 300 of Table 4), so that the notification (notify at the line 270 of Table 4) to the thread in the waiting state is not sent and the thread in the waiting state continues waiting endlessly. Therefore it is necessary to strictly keep the order of a certain pair of store and load instructions as the tasuki constraint in memory access serialization.

FIG. 3 is a diagram for explaining means for ensuring serialization of store and load instructions in each thread. Referring to FIG. 3(a), a fence instruction is inserted between store and load instructions, thereby ensuring that the store and load instructions preceding the fence instruction in code number in each thread are also preceding the fence instruction in memory access order, and that the store and load instructions following the fence instruction in code number in each thread also follow the fence instruction in memory access order. Referring to FIG. 3(b), a sync instruction is inserted between store and load instructions, thereby ensuring that all instructions, including other instructions such as add (addition) and sub (subtraction) instructions as well as the load and store instructions, preceding the fence instruction in code number in each thread are also preceding the fence instruction in execution order, and that all instructions following the fence instruction in code number in each thread also follow the fence instruction in execution order.

PROBLEMS TO BE SOLVED BY THE INVENTION

The problem with use of the fence instruction is that a considerably large overhead occurs if such an explicit serialization instruction is executed. Therefore, in an implementation of the tasuki lock using an explicit serialization instruction necessary in an advanced CPU, the advantage that only one atomic instruction suffices is lost. Thus, the high-balance tasuki lock algorithm capable of ensuring high-speed locking and efficient lock wait has not been implemented on current CPUs having an out-of-order load execution mechanism by imposing the tasuki restraint without losing its balance.

An object of the present invention is to provide a method, an apparatus, a program and a recording medium for performing memory access serialization and lock management so as to ensure the desired reliability with which store instructions and load instructions are serialized in a program with respect to memory access in spite of the load instruction out-of-order execution function of the CPU without impairing the high-speed performance.

SUMMARY OF THE INVENTION

According to the present invention, a mechanism which is implicitly provided in a CPU so as not to change the meaning of a program, and use of which is ordinarily avoided, is positively used. This technique is called store forwarding avoidance (SFA). This technique is used not only for the tasuki lock (the algorithm shown in Table 4) but also to ensure memory access serialization in other fields if conditions described below are satisfied.

In CPUs making out-of-order execution of load, it is important to conceal the load latency. Many of such CPUs has a store forwarding (SF) mechanism for enabling results of store to be used in the CPU by being loaded into the CPU. In such CPUs, for speedup of store execution, store results are temporarily stored in a store buffer and thereafter written to a memory hierarchy. If a load is executed in the same CPU by referring to the store results, the store results can be immediately read from the store buffer by store forwarding. Thus, the latency with respect to reading from the memory hierarchy can be concealed. There are several conditions for enabling SF (considered ordinary conditions for efficient use of resources according to a hardware design). Typically, a memory to be accessed is of the same address and the same size. For example, the result of 4-byte storage at address 100 is store-forwarded by an instruction for 4-byte load from the address 100. However, the result of 4-byte storage at address 100 is not store-forwarded by an instruction for 8-byte load from the address 100. If store forwarding is not performed, the store result is written from the store buffer to the memory hierarchy, and read from the memory hierarchy is performed for load. That is, when store forwarding is not performed, out-of-order execution of load is not executed by outrunning store. The key point of the present invention resides in positive use of this characteristic.

A computer with which a memory access serialization method of the present invention is executed has a plurality of CPUs and a memory shared by the plurality of CPUs. Each CPU has an out-of-order execution stop mechanism. If address regions on the memory relating to a pair of a store instruction and a load instruction in preceding and subsequent positions, respectively, in written order of a program executed by each of the CPUs have an overlap therebetween, the out-of-order execution stop mechanism stops out-of-order execution of the load instruction and enables data relating to the store instruction to be observed from the other CPUs before execution of the load instruction. The computer memory access serialization method includes a detection step of enabling each CPU to detect the pair of the store instruction and the load instruction, which need to be serialized in a before-after relationship with respect to memory access, which are in the preceding and following positions in written order on the program, and which are placed on the program by being set so that their address regions have an overlap therebetween and respectively include address regions for data which needs to be stored and loaded, and an activation step of activating, with respect to the detected pair of instructions, the out-of-order execution stop mechanism of one of the CPUs executing the program relating to the detected pair of instructions.

The memory access serialization method of the present invention is not limited to an application to an object lock management method described below. In the memory access serialization method, with respect to a store instruction and a load instruction in preceding and subsequent positions in written order of a program, memory access operations are serialized in accordance with serialization on the program in spite of the out-of-order execution function of the CPU. The computer with which the memory access serialization method of the present invention is implemented is not limited to the type in which each CPU has a store buffer and is capable of store forwarding (SF) and store forwarding avoidance (SFA). The memory access serialization method of the present invention can also be applied to computers in which each CPU does not have a store buffer and SF and SFA mechanisms. Preferably, the memory access serialization method of the present invention includes a step of extracting essentially necessary data from data loaded by the load instruction in the above-mentioned pair of instructions with an address region increased relative to that for data which essentially needs to be loaded, to enable activation of the out-of-order execution stop mechanism. For compatibility with such an extraction step, the address region of the load instruction in the pair of instructions is set so that data which does not need to be loaded is loaded as well as data which essentially needs to be loaded, while the address region of the store instruction is set so as to load only data which essentially needs to be stored.

According to a preferable memory access serialization method, each CPU has a store buffer for writing data to the memory according to the store instruction of the program. The out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other. In the activation step, the CPU executing the program relating the detected pair of instructions is made to activate the SFA mechanism in the out-of-order execution stop mechanism with respect to the pair of instructions.

Another preferable memory access serialization method sets the address region of the load instruction so as to load data which does not need to be loaded as well as data which needs to be loaded, while setting the address region of the store instruction so as to store only data which essentially needs to be stored, and includes a load instruction execution step of executing load of data on this load instruction, and an extraction step of extracting the data which needs to be loaded from the data loaded by the load instruction. For example, the program includes first and second program portions relating to first and second processings, the first and second processings including a store processing portion, an observation processing portion for observing data that might have been stored by the other processing after execution of the store processing portion, and a branching processing portion for branching to a corresponding process according to a result of observation by the observation processing portion. The pair of the store instruction and the load instruction are included in the store processing portion and the observation processing portion in the first and, second processings. Preferably, the first and second processings are processing relating to object lock release and processing relating to object acquisition, respectively, in an object management method.

A computer with which a lock management method of the present invention is executed has a plurality of CPUs and a memory shared by the plurality of CPUs. Each CPU has an out-of-order execution stop mechanism. If address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction. According to the lock management method of the present invention, a lock on an object is managed by preparing, in a storage area provided in correspondence with the object, a field for storing a bit indicating the kind of lock and an identifier for a thread acquiring a lock according to the first kind of lock or an identifier relating to the second kind of lock, in a situation where a plurality of threads exist. The lock management method of the present invention includes an object acquisition method of enabling a second thread to obtain a lock on a certain object held by a first thread, and a lock release method of enabling the first thread to release the lock from the certain object. The object acquisition method includes (a1) a step of determining whether or not the bit indicating the kind of lock on the certain object indicates the first kind of lock, and (a2) a step of setting a contention bit when the first kind of lock is indicated. The lock release method includes (b1) a step of determining whether or not the bit indicating the kind of lock indicates the first kind of lock, (b2) a step of storing, in the storage area, information indicating that no thread holding the lock on the certain object existed (b3) a step of determining whether or not the contention bit is set when the bit indicating the kind of lock indicates the first kind of lock, and (b4) a step of terminating processing if it is determined that the contention bit is not set. Address regions on the memory relating to a store instruction S corresponding to storage in the step (b2) and a load instruction L corresponding to read of the bit in the step (b3) are set so that the out-of-order execution stop mechanism is activated with respect to the store instruction S and the load instruction L. The steps (b2) and (b3) are executed on the basis of this setting.

"Identifier relating the second kind of lock" is the identifier of the monitor related to each object in the embodiment of the present invention. Steps (a1) and (a2) correspond to the lines 90 and 100, respectively, of Table 4. Steps (b1), (b2), (b3), and (b4) correspond to the lines 210, 220, 230, and 300, respectively, of Table 4.

Preferably, the lock release method further includes (b5) a step of enabling the first thread to enter a state under exclusive control performed by a mechanism when it is determined that the contention bit is set, the mechanism enabling exclusive control of access to the object and, if a predetermined condition is satisfied, a waiting operation of the thread and a notification operation to the thread in the waiting state, (b6) a step of executing a notification operation to the thread in the waiting state, and (b7) a step of enabling the first thread to exit from the state under exclusive control. Steps (b5), (b6), and (b7) correspond to the lines 260, 270, and 280, respectively, of Table 4.

The first kind of lock is, for example a lock method in which the state of lock on an object by a thread is managed by storing the identifier of the thread in correspondence with the object. The second kind of object is, for example, a lock method of managing the thread making access to the object by using a queue.

A computer with which another lock management method of the present invention is executed has a plurality of CPUs and a memory shared by the plurality of CPUs. Each CPU has an out-of-order execution stop mechanism. If address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction. According to the lock management method of the present invention, a lock on an object is managed by preparing, in a storage area provided in correspondence with the object, a field for storing a bit indicating the kind of lock and an identifier for a thread acquiring a lock according to the first kind of lock or an identifier relating to the second kind of lock which is a lock method of managing the thread making access to the object by using a queue, in a situation where a plurality of threads exist. The lock management method of the present invention includes (c1) a step of enabling a first thread to enter a state under exclusive control performed by a mechanism enabling exclusive control of access to the object and, if a predetermined condition is satisfied, a waiting operation of the thread and a notification operation to the thread in the waiting state, (c2) a step of determining whether or not the bit indicating the kind of lock on a certain object indicates the first kind of lock, (c3) a step of setting a contention bit when the bit indicating the kind of lock on the certain object indicates the first kind of lock, (c4) a step of determining, after the step (c3), whether or not the first thread can acquire the first kind of lock on the basis of the contents of the storage area provided in correspondence with the certain object; and (c5) a step of storing the bit indicating the second kind of lock and the identifier relating to the second kind of lock in the storage area provided in correspondence with the certain kind of object when the first thread can acquire the first kind of lock. The first thread exits from the state under exclusive control after the completion of necessary processing on the certain object. Address regions on the memory relating to a store instruction S corresponding to the setting of the contention bit in the step (c3) and a load instruction L corresponding to read of the contents of the storage area in the step (c4) are set so that the out-of-order execution stop mechanism is activated with respect to the store instruction S and the load instruction L. The steps (c3) and (c4) are executed on the basis of this setting.

Steps (c1), (c2), (c3), (c4), and (c5) correspond to the lines 70, 90, 100, 110, and 120, respectively, of Table 4.

Preferably, the lock management method further includes (c6) a step of enabling the first thread to enter a state of waiting at the mechanism when the first thread cannot acquire the first kind of lock, (c7) a step of performing processing without an exit of the first thread from the state under exclusive control by assuming that the first thread has acquired the second kind of lock when the bit indicating the kind of lock does not indicate the first kind of lock as the lock on the certain object, and (c8) a step of performing processing without an exit of the first thread from the state under exclusive control by assuming that the first thread has acquired the second kind of lock when the bit indicating the kind of lock indicates the second kind of lock as the lock on the certain object in the above-described step (c2). Step (c6) corresponds to the line 140 of Table 4. Step (c8) corresponds to entry of the first thread into the monitor at the line 70 of Table 4 and skipping the lines 90 to 140, as does step (c7). The condition in step (c7) is "when the first kind of lock is not indicated", while the condition in step (c8) is "when the second kind of lock is indicated". Preferably, the computer with which the lock management method is executed has a plurality of CPUs and a memory shared by the plurality of CPUs. Each CPU has an out-of-order execution stop mechanism. If address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction. According to the lock management method, a lock on an object is managed by preparing, in a storage area provided in correspondence with the object, a field for storing a bit indicating the kind of lock and an identifier for a thread acquiring a lock according to the first kind of lock or an identifier relating to the second kind of lock, in a situation where a plurality of threads exist. The lock management method includes an object acquisition method of enabling a second thread to obtain a lock on a certain object held by a first thread, and a lock release method of enabling the first thread to release the lock from the certain object. The object acquisition method includes (a1) a step of determining whether or not the bit indicating the kind of lock on the certain object indicates the first kind of lock, and (a2) a step of setting a contention bit when the first kind of lock is indicated. The lock release method includes (b1) a step of determining whether or not the bit indicating the kind of lock indicates the first kind of lock, (b2) a step of storing, in the storage area, information indicating that no thread holding the lock on the certain object exists, (b3) a step of determining whether or not the contention bit is set when the bit indicating the kind of lock indicates the first kind of lock, and (b4) a step of terminating lock release processing without performing any processing other than releasing the lock on the certain object if it is determined that the contention bit is not set. Address regions on the memory relating to a store instruction S corresponding to storage in the step (b2) and a load instruction L corresponding to read of the bit in the step (b3) are set so that the out-of-order execution stop mechanism is activated with respect to the store instruction S and the load instruction L. The lock release method further includes (d1) a step of determining whether or not the lock on the certain object acquired by the first thread is the second kind of lock, (d2) a step of determining whether or not any thread exists in a sate of waiting at the mechanism enabling exclusive control of access to the object and, if a predetermined condition is satisfied, a waiting operation of the thread and a notification operation to the thread in the waiting state when the lock on the certain object acquired by the first thread is the second kind of lock, and (d3) a step of storing, in the storage area, information indicating that no thread holding the lock exists if no other thread exists. Steps (d1), (d2), and (d3) correspond to the lines 210, 340, and 360, respectively, of Table 4.

According to a preferable lock management method, each CPU has a store buffer for writing data to the memory according to the store instruction of the program. The out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other. Also, the address regions on the memory relating to the store instruction S and the load instruction L are set to activate the store forwarding avoidance mechanism, and the steps (b2) and (b3) and the steps (c3) and (c4) are executed on the basis of this setting.

A computer implemented with a memory access serialization apparatus of the present invention has a plurality of CPUs and a memory shared by the plurality of CPUs. Each CPU has an out-of-order execution stop mechanism. If address regions on the memory relating to a part of a store instruction and a load instruction in preceding and subsequent positions, respectively, in written order of a program executed by each of the CPUs have an overlap therebetween, the out-of-order execution stop mechanism stops out-of-order execution of the load instruction and enables data relating to the store instruction to be observed from the other CPUs before execution of the load instruction. The computer memory access serialization apparatus includes detection means of enabling each CPU to detect the pair of the store instruction and the load instruction, which need to be serialized in a before-after relationship with respect to memory access, which are in the preceding and following positions in written order on the program, and which are placed on the program by being set so that their address regions have an overlap therebetween and respectively include address regions for data which needs to be stored and loaded, and activation means of activating, with respect to the detected pair of instructions, the out-of-order execution stop mechanism of one of the CPUs executing the program relating to the detected pair of instructions.

Preferably, the computer memory access serialization apparatus has a plurality of CPUs and a memory shared by the plurality of CPUs. Each CPU has a store buffer for writing data to the memory according to the store instruction of the program. The out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other. The activation means activates, with respect to the detected pair of instructions, the SFA mechanism in the out-of-order execution stop mechanism of one of the CPUs executing the program relating to the detected pair of instructions.

A preferable computer memory access serialization apparatus includes load instruction execution means of executing load of data on the basis of the load instruction in the pair of instructions, the address region of the store instruction being set so as to store only data which essentially needs to be stored, the address region of the load instruction being set so as to load data which does not need to be loaded as well as data which needs to be loaded, and extraction means of extracting the data which needs to be loaded from the data loaded by the load instruction. Preferably, the program includes first and second program portions relating to first and second processings, the first and second processings including a store processing portion, an observation processing portion for observing data that might have been stored by the other processing after execution of the store processing portion, and a branching processing portion for branching to a corresponding process according to a result of observation by the observation processing portion, and the pair of the store instruction and the load instruction are included in the store processing portion and the observation processing portion in the first and second processings. For example, the first and second processings are processing relating to object lock release and processing relating to object acquisition, respectively, in an object management apparatus.

PREFERRED EMBODIMENT

An embodiment of the present invention will be described with reference to the accompanying drawings.

FIG. 4 is a diagram outlining the configuration of a computer 10. The computer 10 comprises hardware 12 including a plurality of CPUs and a main memory, an operating system (OS) 14, and an application program 20. The OS 14 has an ability to enable a plurality of threads operating as application program 20 to run. The OS 14 also provides functions necessary for a queue lock. Application program 20 executes, for example, lock management, and includes a monitoring function and locking and unlocking functions. Further, a Java® virtual machine (VM) 18 may be provided on the OS 14 and an applet or application program 20 may be executed on the Java® VM 18. An applet or application program 20 can be executed in multiple threads. In the Java® language, a monitoring function and the locking and unlocking functions in accordance with the present invention are incorporated in Java® VM 18. Java® VM 18 may also be incorporated as a portion of the OS 14. The computer 10 may be a computer having no auxiliary storage unit, i.e., a so-called network computer.

FIG. 5 is a diagram showing serialization of store instructions and load instructions on a program. According to the present invention, particular pairs of store and load instructions on a program are implicitly serialized in accordance with serialization on the program without using "fence" or "sync" such shown in FIG. 3(a) or 3(b).

FIG. 6 is a diagram for explaining store forwarding (SF). A CPU 32 has a store buffer 34, a cache line 36, and a register (not shown). Data to be stored from the register of the CPU 32 into a memory 38 by a store instruction from a program 30 is sent via the store buffer 34 and the cache line 36. Also, data to be loaded from the memory 38 into the register of the CPU 32 by a store instruction from the program 30 is sent via the cache line 36. In the computer 10 having a plurality of CPUs 32, the memory 38 is shared by all the CPUs 32, while the store buffer 34 and the cache line 36 are provided in each CPU 32. In the program 30, store instructions and load instructions are described in their order. With respect to the example shown in FIG. 6, it is assumed that an address region of the memory 38 in which data is stored by a store instruction is a region A identical to an address region of the memory 38 into which data is loaded by a load instruction. In this case, the CPU 32 cancels out-of-order execution of the load instruction from the program 30 and, in response to the load instruction from the program 30, sends to the program 30 data written in the store buffer 34 by the store instruction from the program 30 without loading data from the cache line 36 or from the memory 38. Such a flow of data between a store instruction and a load instruction is called SF.

FIG. 7 is a diagram for explaining store forwarding avoidance (SFA). With respect to the example shown in FIG. 7, it is assumed that an address region A of the memory 38 for storing data by a store instruction and an address region A' of the memory 38 in which data is loaded by a load instruction are in a relationship $A \subset A'$. Requirements for realization of SFA are the following two conditions (a) and (b).

(a) A and A' are not perfectly the same.

(b) $A \cap A'$ is not an empty set.

When these two requirements are satisfied, the CPU 32 does not perform out-of-order execution of load instruction. Instead, the CPU 32 executes SFA. $A \subset A'$ satisfies the requirements (a) and (b). With respect to a load instruction, the CPU 32 gives higher priority to SF and SFA in comparison with that to out-of-order execution of the load instruction. Thus, data in the address area A is written from the store buffer 34 to the cache line 36. Data in the memory 38 may be temporarily different from data on the cache line 36 during operation of the CPU 32. However, coincidence therebetween is ensured. For speedup of data read/write by the CPU 32, part of data in the memory 38 is copied to the cache line 36. The CPU 32 performs data read/write on the cache line 36 as long as data exists on the cache line 36. The cache line 36 and the memory 38 belong to the memory hierarchy and the contents therein can be observed from any of the CPUs. In the present invention, SFA is positively utilized in order to ensure serialization of memory access in accordance with serialization of store instructions and load instructions on a program and to enable observation of data relating to a store instruction (to make data visible) from the other CPUs. In conventional computers, SFA occurs in cases of absolute necessity when SF cannot be executed, and SFA is of no value in terms of positive use.

FIG. 8 is a diagram for explaining the relationship between the structure of an object header 46 and SFA. In the example shown in FIG. 8, the object header 46 is formed of three words. One word is four bytes, and the size of the object header 46 is twelve bytes. A flc bit 48 exists in the first word of the object header 46, and a thread ID (TID) 50 exists in the third word of the object header 46. The TID 50 is, typically, fifteen bits. A store instruction and a load instruction in a thread A are realized as "store" by a 2-byte move instruction and "load" by an 8-byte field instruction, respectively, if the CPU is, for example, Intel IA-32. In this implementation, the field has its value in an FP register and a check of the flc bit only cannot be immediately performed. Therefore it is temporarily rewritten to the memory by a first instruction. If a SSE instruction or SSE2 instruction can be used, the flc bit can be immediately checked on the register to realize a load instruction with improved efficiency. In the order of description on the code in threads A and B, the store instruction precedes the load instruction. The store instruction in the thread A sets the TID 50 to 0 and corresponds to the line 220 in Table 4. Flc bit 48 extracted in thread A is used at the line 230 in Table 4. On the other hand, the store instruction in the thread B sets flc bit 48 and corresponds to the line 100 in Table 4. The TID 50 extracted in thread B is used at the line 110 in Table 4. The lines 100 and 110 in Table 4 exist in a program description portion for object acquisition processing in the tasuki lock. The lines 220 and 230 in Table 4 exist in a program description portion for unlocking processing in the tasuki lock. The direction of read/write of data in the object header is a downward direction as viewed in FIG. 8 and a left-to-right direction with respect to one line. For realization of SFA with the load instructions in the threads A and B, a SFA area (sfa area: a hatched area in FIG. 8) is set as a predetermined address region. This SFA area includes a flc bit address region and a tid address region and is set as an area satisfying the above-described conditions for effecting SFA in execution of the store instructions and the following load instructions in the threads A and B. The maximum size of data read by a load instruction varies among CPUs. In the case of a typical CPU, the maximum size is sixteen bytes. In the thread A, the contents of the sfa area are loaded into the register by the load instruction, and the flc bit is then extracted from the contents of the sfa area. In the thread B, the contents of the sfa area are loaded into the register by the load instruction, and id is then extracted from the contents of the sfa area. Thus, actual memory access by store and load instructions can be controlled in accordance of serialization of the store and load instructions on a program by using SFA.

FIG. 9 is a diagram for explaining the relationship between another object header structure and SFA. In the object header shown in FIG. 9, both tid and a flc bit are placed in the third word. Correspondingly, the address region "sfa area" is set in the address area (four bytes) of the third word. This sfa area is also set as an area satisfying the above-described conditions for effecting SFA in execution of store instructions and following load instructions in threads A and B, as is the sfa area in the case shown in FIG. 8. Actual memory access by store and load instructions can be controlled in accordance of serialization of the store and load instructions on a program by realizing SFA in each thread.

FIG. 10 is a diagram for explaining a situation where data stored by a CPU implemented with SFA can be observed from other CPUs. Fist and second programs 30*a* and 30*b* are descriptions with which serialization in threads A and B shown in FIG. 8 is ensured. While only two CPUs, i.e., the first and second CPUs 32*a* and 32*b*, are shown in FIG. 10, the computer 10 may have three or more CPUs. The CPUs are identical to each other in configuration, and the first and second programs 30*a* and 30*b* are also identical in configuration. The CPUs respectively have store buffers 34*a* and 34*b* and cache lines 36*a* and 36*b*. The CPUs have the cache lines 36 connected to each other via an external bus 54. The consistency of the caches of the CPUs in a sense described below is maintained by a cache consistency protocol. For example, after data from the store buffer 34*a* has been written to the cache line 36*a* in the first program 30*a*, any other CPU or the second CPU 32*b* can read out through its cache line 36*b* the data written to the cache line 36*a* by the first CPU 32*a* if it accesses in its cache line 36*b* the same address region as that for the data written to the cache line 36*a*. That is, even if the second CPU 32*b* has an old cache line 36*b*, the line is made invalid by the protocol. In FIG. 10, f1 to f4 indicate flows of data when TID which is data stored by a store instruction in the first program 30*a* is read by a load instruction in the second program 30*b* in the case of realization of SFA in the first CPU 32*a*. TID to be stored by the store instruction in the first program 30*a* is written to the store buffer 34*a* (f1), written to the cache line 36*a* by SFA (f2), and then written to the cache line 36*b* according to the load instruction in the second program 30*b* (f3). The program 30*b* is notified of the result of this write via the cache line 36*b* and the register (not shown) in the second CPU 32*b* (f4).

FIG. 11 is a flowchart of a portion of unlocking processing realizing SFA to meet the tasuki constraint of the tasuki lock. Steps S60, S66, and S68 correspond to the lines 220, 230, and 250 in Table 4. In object unlocking processing, if it is found that the present locking state is a thin lock (the line 210 in Table 4), 0 is substituted in tid by using a store instruction (S60). Next, the contents of sfa area are loaded by using a load instruction (S62). SFA is realized by S60 and S62. A flc bit is obtained by extraction from the contents of sfa area (S64). A determination is then made as to whether the flc bit is "0" or "1". If the flc bit is "0", that is, no contending condition exists with respect to acquisition of the object, then unlocking processing is terminated. If the flc bit is "1", that is, a contending condition exists with respect to acquisition of the object, the process enters monitoring of the object (S68).

CPUs such as Pentium® 4 and Power 4 operating on a higher clock and having a higher degree of out-of-order is supposed to have a higher serialization overhead. (As an experiment for checking this tendency, a microbenchmark test based on repeated execution of the Random-class nextint method, which is a typical synchronized method for Java®, was executed in an Intel IA-32 multiprocessor environment using an IBM Java® JIT compiler. The test was made on Pentium® III operating on a 933 MHz clock and on Pentium® 4 operating on a clock of 1.5 GHz 1.6 times higher. In the JITed code, lock cmpxchg instruction (required at the time of locking) +lock and instruction (required at the time of unlocking) are performed with respect to the synchronized method. Even though the nextint method has a suitable amount of computation (64-bit multiplication and shift), the influence of the serialization instruction recognized in the test results is large. According to the test results, Pentium® 4 is 2.7 times slower than Pentium® III due to the influence of the serialization instruction. If the clock ratio is considered, Pentium® 4 is 4.3 times slower than Pentium® III.) Therefore the access serialization effect based on use of SFA is high. A thin lock will be considered as a basis for comparison. A thin lock is said to be a prototype of the tasuki lock, and tasuki lock=thin lock+tasuki constraint. In the Random.next microbenchmark test on Pentium® 4, the performance of the tasuki lock is reduced to 65% of that of the thin lock due to the serialization instruction for the tasuki constraint (in the case of a lock prefix instruction, only 71% can be reached even if a mfence instruction, which is a new instruction, is used). The point is that at which level the performance of the thin lock is maintained when the tasuki constraint is introduced.

With respect to implementation with a SSE instruction, the performance of the thin lock has been completely recovered while SFA is applied to memory access serialization. Thus, elimination of spin-wait has been attained in a multiprocessor environment as well as in a single processor environment while the tasuki lock has substantially the same performance as the thin lock. This improvement has great significance with respect to the SPECjvm98 benchmark. The SPECjvm98 benchmark is a benchmark for checking the performance of a plurality of programs. However, only the mtrt program has two-thread parallelism. Therefore the performance of the mtrt program can be simply doubled in the case of execution with two processors. For this reason, many of the SPECjvm98 benchmark test results recently reported have been measured with respect to two processors. In the case of measurement with respect to two processors, however, it is natural that the speed of a program which frequently calls the synchronized method is reduced. Improvements achieved as a result of application of SFA are db 12%, java® c 7.3%, jack 3.2%, and geometric means 2.4%. These values are the results of the next best implementation by fild/fistp on the present IBM Java®, and the best performance has not been attained because of occurrence of useless SFA by the test of fistp and the flc bit. It is to be noted that an implementation in which the TID field and the flc bit are in the same word, and which has been described with respect to FIG. 9, has the potential to further improve the performance.

For summary, configurations of the present invention are shown below.

(1) A method of memory access serialization in a computer having a plurality of CPUs and a memory shared by the plurality of CPUs, each CPU having an out-of-order execution stop mechanism, in which, if address regions on the memory relating to a pair of a store instruction and a load instruction in preceding and subsequent positions, respectively, in written order of a Program executed by each of the CPUs have an overlap therebetween, the out-of-order execution stop mechanism stops out-of-order execution of the load instruction and enables data relating to the store instruction to be observed from the other CPUs before execution of the load instruction, the method including:

a detection step of enabling each CPU to detect the pair of the store instruction and the load instruction, which need to be serialized in a before-after relationship with respect to memory access, which are in the preceding and following positions in written order on the program, and which are placed on the program by being set so that their address regions have an overlap therebetween and respectively include address regions for data which needs to be stored and loaded; and an activation step of activating, with respect to the detected pair of instructions, the out-of-order execution stop mechanism of one of the CPUs executing the program relating to the detected pair of instructions.

(2) The memory access serialization method described in (1), wherein each CPU has a store buffer for writing data to the memory according to the store instruction of the program;

wherein the out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein, in the activation step, with respect to the detected pair of instructions, the SFA mechanism in the out-of-order execution stop mechanism of one of the CPUs executing the program relating to the detected pair of instructions is activated.

(3) The memory access serialization method described in (1) or (2), further including:

a load instruction execution step of executing load of data on the basis of the load instruction in the pair of instructions, the address region of the store instruction being set so as to store only data which essentially needs to be stored, the address region of the load instruction being set so as to load data which does not need to be loaded as well as data which needs to be loaded; and an extraction step of extracting the data which needs to be loaded from the data loaded by the load instruction.

(4) The memory access serialization method described in anyone of (1) to (3), wherein the program includes first and second program portions relating to first and second processings, the first and second processings including a store processing portion, an observation processing portion for observing data that might have been stored by the other processing after execution of the store processing portion, and a branching processing portion for branching to a corresponding process according to a result of observation by the observation processing portion; and wherein the pair of the store instruction and the load instruction are included in the store processing portion and the observation processing portion in the first and second processings (5) The memory access serialization method described in (4), wherein the first and second processings are processing relating to object lock release and processing relating to object acquisition, respectively, in an object management method.

(6) A method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, the lock management method including:

managing a lock on an object by preparing, in a storage area provided in correspondence with the object, a field for storing a bit indicating the kind of lock and an identifier for a thread acquiring a lock according to the first kind of lock or an identifier relating to the second kind of lock, in a situation where a plurality of threads exist, the lock management method also including:

an object acquisition method of enabling a second thread to obtain a lock on a certain object held by a first thread, and a lock release method of enabling the first thread to release the lock from the certain object, the object acquisition method including:

(a1) a step of determining whether or not the bit indicating the kind of lock on the certain object indicates the first kind of lock; and (a2) a step of setting a contention bit when the first kind of lock is indicated, the lock release method including:

(b1) a step of determining whether or not the bit indicating the kind of lock indicates the first kind of lock;

(b2) a step of storing, in the storage area, information indicating that no thread holding the lock on the certain object exists;

(b3) a step of determining whether or not the contention bit is set when the bit indicating the kind of lock indicates the first kind of lock; and (b4) a step of terminating processing if it is determined that the contention bit is not set, wherein address regions on the memory relating to a store instruction S corresponding to storage in the step (b2) and a load instruction L corresponding to read of the bit in the step (b3) are set so that the out-of-order execution stop mechanism is activated with respect to the store instruction S and the load instruction L; and wherein the steps (b2) and (b3) are executed on the basis of the setting of the address regions.

(7) The lock management method described in (6), wherein each CPU has a store buffer for writing data to the memory according to the store instruction of the program;

wherein the out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein the address regions on the memory relating to the store instruction S and the load instruction L are set to activate the SFA mechanism; and wherein the steps (b2) and (b3) are executed on the basis of the setting of the address regions.

(8) The lock management method described in (6) or (7), wherein the store instruction S corresponding to the storage in the step (b2) is set with its address region selected as an address region A1 relating to the storage region in which information indicating that no thread holding the lock on the certain object exists is stored;

wherein the load instruction L corresponding to the read of the bit in the step (b3) is set with its address region selected as an address region A2 containing the entire address region relating to the bit and at least a portion of the address region A1; and wherein the steps (b2) and (b3) are executed on the basis of this setting.

(9) The lock management method described in any one of (6) to (8), the lock release method further includes:

(b5) a step of enabling the first thread to enter a state under exclusive control performed by a mechanism when it is determined that the contention bit is set, the mechanism enabling exclusive control of access to the object and, if a predetermined condition is satisfied, a waiting operation of the thread and a notification operation to the thread in the waiting state;

(b6) a step of executing a notification operation to the thread in the waiting state; and (b7) a step of enabling the first thread to exit from the state under exclusive control.

(10) A method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, the lock management method including:

managing a lock on an object by preparing, in a storage area provided in correspondence with the object, a field for storing a bit indicating the kind of lock and an identifier for a thread acquiring a lock according to the first kind of lock or an identifier relating to the second kind of lock which is a lock method of managing the thread making access to the object by using a queue, in a situation where a plurality of threads exist, the lock management method also including:

(c1) a step of enabling a first thread to enter a state under exclusive control performed by a mechanism enabling exclusive control of access to the object and, if a predetermined condition is satisfied, a waiting operation of the thread and a notification operation to the thread in the waiting state;

(c2) a step of determining whether or not the bit indicating the kind of lock on a certain object indicates the first kind of lock;

(c3) a step of setting a contention bit when the bit indicating the kind of lock on the certain object indicates the first kind of lock;

(c4) a step of determining, after the step (c3), whether or not the first thread can acquire the first kind of lock on the basis of the contents of the storage area provided in correspondence with the certain object; and (c5) a step of storing the bit indicating the second kind of lock and the identifier relating to the second kind of lock in the storage area provided in correspondence with the certain kind of object when the first thread can acquire the first kind of lock, wherein the first thread exits from the state under exclusive control after the completion of necessary processing on the certain object;

wherein address regions on the memory relating to a store instruction S corresponding to the setting of the contention bit in the step (c3) and a load instruction L corresponding to read of the contents of the storage area in the step (c4) are set so that the out-of-order execution stop mechanism is activated with respect to the store instruction S and the load instruction L; and wherein the steps (c3) and (c4) are executed on the basis of this setting.

(11) The lock management method described in (10), wherein each CPU has a store buffer for writing data to the memory according to the store instruction of the program;

wherein the out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein the address regions on the memory relating to the store instruction S and the load instruction L are set to activate the SFA mechanism; and wherein the steps (c3) and (c4) are executed on the basis of this setting.

(12) The lock management method described in (10) or (11), wherein the store instruction S corresponding to the setting of the contention bit in the step (c3) is set with its address region selected as an address region A1 relating to the contention bit;

wherein the load instruction L corresponding to the read of the contents of the storage area in the step (c4) is set with its address region selected as an address region A2 containing the entire address region of the storage area and at least a portion of the address region A1; and wherein the steps (c3) and (c4) are executed on the basis of this setting.

(13) An apparatus which performs memory access serialization in a computer having a plurality of CPUs and a memory shared by the plurality of CPUs, each CPU having an out-of-order execution stop mechanism, in which, if address regions on the memory relating to a pair of a store instruction and a load instruction in preceding and subsequent positions, respectively, in written order of a program executed by each of the CPUs have an overlap therebetween, the out-of-order execution stop mechanism stops out-of-order execution of the load instruction and enables data relating to the store instruction to be observed from the other CPUs before execution of the load instruction, the memory access serialization apparatus including:

detection means of enabling each CPU to detect the pair of the store instruction and the load instruction, which need to be serialized in a before-after relationship with respect to memory access, which are in the preceding and following positions in written order on the program, and which are placed on the program by being set so that their address regions have an overlap therebetween and respectively include address regions for data which needs to be stored and loaded; and activation means of activating, with respect to the detected pair of instructions, the out-of-order execution stop mechanism of one of the CPUs executing the program relating to the detected pair of instructions.

(14) The memory access serialization apparatus described in (13), wherein a plurality of CPUs and a memory shared by the plurality of CPUs are provided;

wherein each CPU has a store buffer for writing data to the memory according to the store instruction of the program;

wherein the out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein the activation means activates, with respect to the detected pair of instructions, the SFA mechanism in the out-of-order execution stop mechanism of one of the CPUs executing the program relating to the detected pair of instructions.

(15) The memory access serialization apparatus described in (13) or (14), further including:

load instruction execution means of executing load of data on the basis of the load instruction in the pair of instructions, the address region of the store instruction being set so as to store only data which essentially needs to be stored, the address region of the load instruction being set so as to load data which does not need to be loaded as well as data which needs to be loaded; and extraction means of extracting the data which needs to be loaded from the data loaded by the load instruction.

(16) The memory access serialization apparatus described in any one of (13) to (15), wherein the program includes first and second program portions relating to first and second processings, the first and second processings including a store processing portion, an observation processing portion for observing data that might have been stored by the other processing after execution of the store processing portion, and a branching processing portion for branching to a corresponding process according to a result of observation by the observation processing portion; and wherein the pair of the store instruction and the load instruction are included in the store processing portion and the observation processing portion in the first and second processings.

(17) The memory access serialization apparatus described in (16), wherein the first and second processings are processing relating to object lock release and processing relating to object acquisition, respectively, in an object management apparatus.

(18) An apparatus which executes lock management with a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, the lock management apparatus managing a lock on an object by preparing, in a storage area provided in correspondence with the object, a field for storing a bit indicating the kind of lock and an identifier for a thread acquiring a lock according to the first kind of lock or an identifier relating to the second kind of lock, in a situation where a plurality of threads exist, the lock management apparatus including:

an object acquisition device which enables a second thread to obtain a lock on a certain object held by a first thread, and a lock release device which enables the first thread to release the lock from the certain object, the object acquisition device including:

(a1) means of determining whether or not the bit indicating the kind of lock on the certain object indicates the first kind of lock; and (a2) means of setting a contention bit when the first kind of lock is indicated, the lock release device including:

(b1) means of determining whether or not the bit indicating the kind of lock indicates the first kind of lock;

(b2) means of storing, in the storage area, information indicating that no thread holding the lock on the certain object exists;

(b3) means of determining whether or not the contention bit is set when the bit indicating the kind of lock indicates the first kind of lock; and (b4) means of terminating processing if it is determined that the contention bit is not set, wherein address regions on the memory relating to a store instruction S corresponding to storage performed by the means (b2) and a load instruction L corresponding to read of the bit performed by the means (b3) are set so that the out-of-order execution stop mechanism is activated with respect to the store instruction S and the load instruction L; and wherein the means (b2) and (b3) perform processing on the basis of this setting.

(19) The lock management apparatus described in (18), wherein each CPU has a store buffer for writing data to the memory according to the store instruction of the program;

wherein the out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of, data B from the memory hierarchy to the program on the basis of the load instruction in the pair of instructions if the address regions on the memory relating to the pair of instructions do not coincide with each other but overlap each other; and wherein the address regions on the memory relating to the store instruction S and the load instruction L are set to activate the SFA mechanism; and wherein the means (b2) and (b3) perform processing on the basis of this setting.

(20) The lock management apparatus described in (18) or (19), wherein the store instruction S corresponding to the storage performed by the means (b2) is set with its address region selected as an address region A1 relating to the storage region in which information indicating that no thread holding the lock on the certain object exists is stored;

wherein the load instruction L corresponding to the read of the bit performed by the means (b3) is set with its address region selected as an address region A2 containing the entire address region relating to the bit and at least a portion of the address region A1; and wherein the means (b2) and (b3) perform processing on the basis of this setting.

(21) The lock management apparatus described in any one of (18) to (20), wherein the lock release device further includes:

(b5) means of enabling the first thread to enter a state under exclusive control performed by a mechanism when it is determined that the contention bit is set, the mechanism enabling exclusive control of access to the object and, if a predetermined condition is satisfied, a waiting operation of the thread and a notification operation to the thread in the waiting state;

(b6) means of executing a notification operation to the thread in the waiting state; and (b7) means of enabling the first thread to exit from the state under exclusive control.

(22) An apparatus which performs lock management with a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, the lock management apparatus managing a lock on an object by preparing, in a storage area provided in correspondence with the object, a field for storing a bit indicating the kind of lock and an identifier for a thread acquiring a lock according to the first kind of lock or an identifier relating to the second kind of lock which is a lock method of managing the thread making access to the object by using a queue, in a situation where a plurality of threads exist, the lock management apparatus including:

(c1) means of enabling a first thread to enter a state under exclusive control performed by a mechanism enabling exclusive control of access to the object and, if a predetermined condition is satisfied, a waiting operation of the thread and a notification operation to the thread in the waiting state;

(c2) means of determining whether or not the bit indicating the kind of lock on a certain object indicates the first kind of lock;

(c3) means of setting a contention bit when the bit indicating the kind of lock on the certain object indicates the first kind of lock;

(c4) means of determining, after the operation of the means (c3), whether or not the first thread can acquire the first kind of lock on the basis of the contents of the storage area provided in correspondence with the certain object; and (c5) means of storing the bit indicating the second kind of lock and the identifier relating to the second kind of lock in the storage area provided in correspondence with the certain kind of object when the first thread can acquire the first kind of lock, wherein the first thread exits from the state under exclusive control after the completion of necessary processing on the certain object;

wherein address regions on the memory relating to a store instruction S corresponding to the setting of the contention bit made by the means (c3) and a load instruction L corresponding to read of the contents of the storage area performed by the means (c4) are set so that the out-of-order execution stop mechanism is activated with respect to the store instruction S and the load instruction L; and wherein the means (c3) and (c4) perform processing on the basis of this setting.

(23) The lock management apparatus described in (22), wherein each CPU has a store buffer for writing data to the memory according to the store instruction of the program;

wherein the out-of-order execution stop mechanism has a store forwarding (SF) mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance (SFA) mechanism which stops out-of-order execution of the load instruction in the pair of instructions and performs, instead of SF, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein the address regions on the memory relating to the store instruction S and the load instruction L are set to activate the SFA mechanism; and wherein the means (c3) and (c4) perform processing on the basis of this setting.

(24) The lock management apparatus described in (22) or (23), wherein the store instruction S corresponding to the setting of the contention bit made by the means (c3) is set with its address region selected as an address region A1 relating to the contention bit;

wherein the load instruction L corresponding to the read of the contents of the storage area performed by the means (c4) is set with its address region selected as an address region A2 containing the entire address region of the storage area and at least a portion of the address region A1; and wherein the means (c3) and (c4) perform processing on the basis of this setting.

(25) A program for a method of memory access serialization in a computer having a plurality of CPUs and a memory shared by the plurality of CPUs, each CPU having an out-of-order execution stop mechanism, in which, if address regions on the memory relating to a pair of a store instruction and a load instruction in preceding and subsequent positions, respectively, in written order of a program executed by each of the CPUs have an overlap therebetween, the out-of-order execution stop mechanism stops out-of-order execution of the load instruction and enables data relating to the store instruction to be observed from the other CPUs before execution of the load instruction, the memory access serialization method including:

a detection step of enabling each CPU to detect the pair of the store instruction and the load instruction, which need to be serialized in a before-after relationship with respect to memory access, which are in the preceding and following positions in written order on the program, and which are placed on the program by being set so that their address regions have an overlap therebetween and respectively include address regions for data which needs to be stored and loaded; and an activation step of activating, with respect to the detected pair of instructions, the out-of-order execution stop mechanism of one of the CPUs executing the program relating to the detected pair of instructions, the program being used to make the computer perform the steps of the lock management method.

(26) A recording medium on which the program described in (25) is recorded.

(27) A program for a method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, the lock management method including managing a lock on an object by preparing, in a storage area provided in correspondence with the object, a field for storing a bit indicating the kind of lock and an identifier for a thread acquiring a lock according to the first kind of lock or an identifier relating to the second kind of lock, in a situation where a plurality of threads exist, the lock management method also including an object acquisition method of enabling a second thread to obtain a lock on a certain object held by a first thread, and a lock release method of enabling the first thread to release the lock from the certain object, the object acquisition method including:

(a1) a step of determining whether or not the bit indicating the kind of lock on the certain object indicates the first kind of lock; and (a2) a step of setting a contention bit when the first kind of lock is indicated, the lock release method including:

(b1) a step of determining whether or not the bit indicating the kind of lock indicates the first kind of lock;

(b2) a step of storing, in the storage area, information indicating that no thread holding the lock on the certain object exists;

(b3) a step of determining whether or not the contention bit is set when the bit indicating the kind of lock indicates the first kind of lock; and (b4) a step of terminating processing if it is determined that the contention bit is not set, address regions on the memory relating to a store instruction S corresponding to storage in the step (b2) and a load instruction L corresponding to read of the bit in the step (b3) being set so that the out-of-order execution stop mechanism is activated with respect to the store instruction S and the load instruction L, the steps (b2) and (b3) being executed on the basis of the setting of the address regions, the program being used to make the computer to execute the steps of the lock management method.

(28) A recording medium on which the program described in (27) is recorded.

(29) A program for a method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, the lock management method including managing a lock on an object by preparing, in a storage area provided in correspondence with the object, a field for storing a bit indicating the kind of lock and an identifier for a thread acquiring a lock according to the first kind of lock or an identifier relating to the second kind of lock which is a lock method of managing the thread making access to the object by using a queue, in a situation where a plurality of threads exist, the lock management method also including:

(c1) a step of enabling a first thread to enter a state under exclusive control performed by a mechanism enabling exclusive control of access to the object and, if a predetermined condition is satisfied, a waiting operation of the thread and a notification operation to the thread in the waiting state;

(c2) a step of determining whether or not the bit indicating the kind of lock on a certain object indicates the first kind of lock;

(c3) a step of setting a contention bit when the bit indicating the kind of lock on the certain object indicates the first kind of lock;

(c4) a step of determining, after the step (c3), whether or not the first thread can acquire the first kind of lock on the basis of the contents of the storage area provided in correspondence with the certain object; and (c5) a step of storing the bit indicating the second kind of lock and the identifier relating to the second kind of lock in the storage area provided in correspondence with the certain kind of object when the first thread can acquire the first kind of lock, the first thread exiting from the state under exclusive control after the completion of necessary processing on the certain object, address regions on the memory relating to a store instruction S corresponding to the setting of the contention bit in the step (c3) and a load instruction L corresponding to read of the contents of the storage area in the step (c4) being set so that the out-of-order execution stop mechanism is activated with respect to the store instruction S and the load instruction L, and the steps (c3) and (c4) being executed on the basis of the setting of the address regions, the program being used to make the computer to execute the steps of the lock management method.

(30) A recording medium on which the program described in (29) is recorded.

ADVANTAGES OF THE INVENTION

As described above, serialization of store instructions and load instructions with respect to memory access can be ensured without using an explicit instruction which entails a problem in terms of speed.

3. BRIEF DESCRIPTION OF THE DRAWINGS

FIG. 1 is a diagram for explaining a mode transition, a locking field (including FAT_LOCK bit) and the state of a contention bit, section (1) showing a state without a lock, section (2) showing a state in which a thin lock is on and there is no contention, section (3) showing a state in which a thin lock is on and there is contention, section (4) showing a state in which a fat lock is on;

FIG. 2 is a diagram showing an example of a computer in which processing in accordance with the present invention is performed;

FIG. 3 is a diagram for explaining means for ensuring serialization of store instructions and load instructions in each thread;

FIG. 4 is a diagram outlining the configuration of a computer;

FIG. 5 is a diagram for explaining serialization of store instructions and load instructions on a program in the present invention;

FIG. 6 is a diagram for explaining SF;

FIG. 7 is a diagram for explaining SFA;

FIG. 8 is a diagram for explaining the relationship between the structure of an object header and SFA;

FIG. 9 is a diagram for explaining the relationship between the structure of an object header and SFA;

FIG. 10 is a diagram for explaining a situation where stored data in a CPU with SFA can be observed from another CPU; and FIG. 11 is a flowchart of a portion of unlocking processing which realizes SFA to meet the tasuki constraint in the tasuki lock.

DESCRIPTION OF SYMBOLS

| [Description of symbols] | |
|---|---|
| 10 | Computer |
| 16 | Application program |
| 30 | Program |
| 32 | CPU |
| 34 | Store buffer |
| 36 | Cache line |
| 38 | Memory |

What is claimed is:

1. A method of memory access serialization in a computer having a plurality of CPUs and a memory shared by the plurality of CPUs, each CPU having an out-of-order execution slop mechanism, in which, if address regions on the memory relating to a pair of a store instruction and a load instruction in preceding and subsequent positions, respectively, in written order of a program executed by each of the CPUs have an overlap therebetween, the out-of-order execution stop mechanism stops our-of-order execution of the load instruction and enables data relating to the store instruction to be observed from ether CPUs before execution of the load instruction, said method comprising:

a detection step of enabling each CPU to detect the pair of the store instruction and the load instruction, which need to be serialized in a before-after relationship with respect to memory access, which are in the preceding and subsequent positions in written order on the program, and which are placed on the program by being set so that their address regions have an overlap therebetween and respectively include address regions for data which needs to be stored and loaded; and an activation step of activating, with respect to a detected pair of instructions, the out-of-order execution stop mechanism of one of the CPUs executing the program relating to the detected pair of instructions.

2. The method according to claim 1, wherein each CPU has a store buffer for writing data to the memory according to the store instruction of the program;

wherein the out-of-order execution stop mechanism has a store forwarding mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance mechanism which stops out-of-order execution of the load instruction in the pair of instructions and performs, instead of store forwarding, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein, in said activation step, with respect to the detected pair of instructions, the store forwarding avoidance mechanism in the out-of-order execution stop mechanism of one of the CPUs executing the program relating to the detected pair of instructions is activated.

3. The method according to claim 1, further comprising:

a load instruction execution step of executing load of data on the basis of the load instruction in the pair of instructions, the address region of the store instruction being set so as to store only data which essentially needs to be stored, the address region of the load instruction being set so as to load data which does not need to be loaded as well as data which needs to be loaded; and an extraction step of extracting the data which needs to be loaded from the data loaded by the load instruction.

4. The method according to claim 1, wherein the program includes first and second program portions relating to first and second processings, the first and second processings including a store processing portion, an observation processing portion for observing data that might have been stored by the other processing after execution of the store processing portion, and a branching processing portion for branching to a corresponding process according to a result of observation by the observation processing portion; and wherein the pair of the store instruction and the load instruction are included in the store processing portion and the observation processing portion in the first and second processings.

5. The method according to claim 4, wherein the first and second processings are processing relating to object lock release and processing relating to object acquisition, respectively, in an object management method.

6. A method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, said method comprising:

managing a lock on an object by preparing, in a storage area provided in correspondence with the object, a field for storing a bit indicating the kind of lock and an identifier for a thread acquiring a lock according to a first kind of lock or an identifier relating to a second kind of lock, in a situation where a plurality of threads exist, said method also comprising:

an object acquisition method of enabling a second thread to obtain a lock on a certain object held by a first thread, and a lock release method of enabling the first thread to release the lock from the certain object, said object acquisition method including:

(a1) a step of determining whether or not the bit indicating the kind of lock on the certain object indicates the first kind of lock; and (a2) a step of setting a contention bit when the first kind of lock is indicated, said lock release method including:

(b1) a step of determining whether or not the bit indicating the kind of lock indicates the first kind of lock;

(b2) a step of storing, in the storage area, information indicating that no thread holding the lock on the certain abject exists;

(b3) a step of determining whether or not the contention bit is set when the reading of the bit indicating the kind of lock indicates the first kind of lock; and (b4) a step of terminating processing if it is determined that the contention bit is not set, wherein address regions on the memory relating to a store instruction S corresponding to storage in said step (b2) and a load instruction L corresponding to reading of the bit in said step (b3) are set so that the out-of-order execution stop mechanism is activated with respect to the store instruction S and the load instruction L; and wherein said steps (b2) and (b3) are executed on the basis of said setting of the address regions.

7. The method according to claim 6, wherein each CPU has a store buffer for writing data to the memory according to the stare instruction of the program; wherein the out-of-order execution stop mechanism has a store forwarding mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance mechanism which stops out-of-order execution of the load instruction in the pair of instructions and performs, instead of store forwarding, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein the address regions on the memory relating to the store instruction S and the load instruction L are set to activate the store forwarding avoidance mechanism; and wherein said steps (b2) and (b3) are executed on the basis of setting of the address regions.

8. The method according to claim 6, wherein the store instruction S corresponding to the storage in said step (b2) is set with its address region selected as an address region A1 relating to the storage region in which information indicating that no thread holding the lock on the certain object exists is stored;

wherein the load instruction L corresponding to the read of the bit in said step (b3) is set with its address region selected as an address region A2 containing the entire address region relating to the bit and at least a portion or the address region A1; and wherein said steps (b2) and (b3) are executed on the basis of setting of the address regions.

9. The method according to claim 6, wherein said lock release method further includes:

(b5) a step of enabling the first thread to enter a state under exclusive control performed by a mechanism when it is determined that the contention bit is set, the mechanism enabling exclusive control of access to the object and, if a predetermined condition is satisfied, a waiting operation of the thread and a notification operation to the thread in the waiting state;

(b6) a step of executing a notification operation to the thread in the waiting state; and (b7) a step of enabling the first thread to exit from the state under exclusive control.

10. A method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, said method comprising:

managing a lock on an object by preparing, in a storage area provided in correspondence with the object, a field for storing a bit indicating the kind of lock and an identifier for a thread acquiring a lock according to a first kind of lock or an identifier relating to a second kind of lock which is a lock method of managing the thread making access to the object by wing a queue, in a situation where a plurality of threads exist, said method also comprising:

(c1) a step of enabling a first thread to enter a state under exclusive control performed by a mechanism enabling exclusive control of access to the object and, if a predetermined condition is satisfied, a waiting operation of the thread and a notification operation to the thread in the waiting state;

(c2) a step of determining whether or not the bit indicating the kind of lock on a certain object indicates the first kind of lock;

(c3) a step of setting a contention bit when the bit indicating the kind of lock on the certain object indicates the first kind of lock;

(c4) a step of determining, after said step (c3), whether or not the first thread can acquire the first kind of lock on the basis of the contents of the storage area provided in correspondence with the certain object; and (c5) a step of storing the bit indicating the second kind of lock and the identifier relating to the second kind of lock in the storage area provided in correspondence with the certain kind of object when the first thread can acquire the first kind of lock, wherein the first thread exits from the state under exclusive control after the completion of necessary processing on the certain object;

wherein address regions on the memory relating to a store instruction S corresponding to the setting of the contention bit in said step (c3) and a load instruction L corresponding to react of the contents of the storage area in said step (c4) are set so that the out-of-order execution stop mechanism is activated with respect to the store instruction S and the load instruction L; and wherein said steps (c3) and (c4) are executed on the basis of setting of the address regions.

11. The method according to claim 10, wherein each CPU has a store buffer for writing data to the memory according to the store instruction of the program;

wherein the out-of-order execution stop mechanism has a store forwarding mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance mechanism which stops out-of-order execution of the load instruction in the pair of instructions and performs, instead of store forwarding, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein the address regions on the memory relating to the store instruction S and the load instruction L are set to activate the store forwarding avoidance mechanism; and wherein said steps (c3) and (c4) are executed on the basis of said setting of the address regions.

12. The method according to claim 10, wherein the store instruction S corresponding to the setting of the contention bit in said step (c3) is set with its address region selected as an address region A1 relating to the contention bit;

wherein the load instruction L corresponding to the read of the contents of the storage area in said step (c4) is set with its address region selected as an address region A2 containing the entire address region of the storage area and at least a portion of the address region A1; and wherein said steps (c3) and (c4) are executed on the basis of said setting of the address regions.

13. An apparatus which performs memory access serialization in a computer having a plurality of CPUs and a memory shared by the plurality of CPUs, each CPU having an out-of-order execution stop mechanism, in which, if address regions on the memory relating to a pair of a store instruction and a load instruction in preceding and subsequent positions, respectively, in written order of a program executed by each of the CPUs have an overlap therebetween, the out-of-order execution stop mechanism stops out-of-order execution of the load instruction and enables data relating to the store instruction to be observed from the other CPUs before execution of the load instruction, said apparatus comprising:

wherein each CPU is adapted to detect the pair of the store instruction and the load instruction, which need to be serialized in a before-after relationship with respect to memory access, which are in the preceding and subsequent positions in written order on the program, and which are placed on the program by being set so that their address regions have an overlap therebetween and respectively include address regions for data which needs to be stored and loaded; and wherein each of said CPUs is adapted to activate, with respect a the detected pair of instructions, the out-of-order execution stop mechanism of one of the CPUs executing the program relating to the detected pair of instructions.

14. The apparatus according to claim 13, further comprising a plurality of CPUs and a memory shared by the plurality of CPUs;
wherein each CPU has a store buffer for writing data to the memory according to the store instruction of the program;
wherein the out-of-order execution stop mechanism has a store forwarding mechanism which stops out-of-order execution of the load instruction in the pair of instructions and notifies, as data B, of data A written to the store buffer according to the store instruction in the pair of instructions from the store buffer to the program if the address regions on the memory relating to the pair of instructions coincide with each other, and a store forwarding avoidance mechanism which stops out-of-order execution of the load instruction in the pair of instructions and performs, instead of store forwarding, staring of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and
wherein said CPUs activate, with respect to the detected pair of instructions, the store forwarding avoidance mechanism in the out-of-order execution stop mechanism of one or the CPUs executing the program relating to the detected pair of instructions.

15. The apparatus according to claim 13, further comprising:
wherein each of said CPUs is adapted to load data on the basis of the load instruction in the pair of instructions, the address region of the store instruction being set so as to store only data which essentially needs to be stored, the address region of the load instruction being set so as to load data which does not need to be loaded as well as data which needs to be loaded; and
wherein each of said CPUs is adapted to extract the data which needs to be loaded from the data loaded by the load instruction.

16. The apparatus according to claim 13, wherein each of said CPUs is adapted to perform first and second program portions relating to first and second processings, the first and second processings including a store processing portion, an observation processing portion for observing data that might have been stored by the other processing after execution of the store processing portion, and a branching processing portion for branching to a corresponding process according to a result of observation by the observation processing portion; and
wherein the pair of the store instruction and the load instruction are included in the store processing portion and the observation processing portion in the first and second processing.

17. The apparatus according to claim 16, wherein the first and second processings are processing relating to object lock release and processing relating to object acquisition, respectively, in an object management apparatus.

18. An apparatus which executes lock management with a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, said apparatus managing a look on an object by preparing, in a storage area provided in correspondence with the object, a field for storing a bit indicating the kind of lock and an identifier for a thread acquiring a lock according to the first kind of lock or an identifier relating to the second kind of lock, in a situation where a plurality of threads exist, said apparatus comprising:
an object acquisition device which enables a second thread to obtain a lock on a certain object held by a first thread, and a lock release device which enables the first thread to release the lock from the certain object, wherein each of said CPUs is adapted to:
(a1) determine whether or not the bit indicating the kind of lock on the certain object indicates the first kind of lock; and
(a2) set a contention bit when the first kind of lock is indicated, said lock release device including:
(b1) determine whether or not the bit indicating the kind of lock indicates the first kind of lock;
(b2) store in the storage area, information indicating that no thread holding the lock on the certain object exists;
(b3) determine whether or not the contention bit is set when the bit indicating the kind of lock indicates the first kind of lock; and
(b4) terminate processing if it is determined that the contention bit is not set,
wherein address regions on the memory relating to a store instruction S corresponding to storage performed in (b2) and a load instruction L corresponding to read of the bit performed in (b3) are set so that the out-of-order execution stop mechanism is activated with respect to the store instruction S and the load instruction L; and
wherein (b2) and (b3) perform processing on the basis of setting of the address regions.

19. The apparatus according to claim 18, wherein each CPU has a store buffer for writing data to the memory according to the store instruction of the program;
wherein the out-of-order execution stop mechanism has a store forwarding mechanism which stops out-of-order execution of the load instruction in the pair of instructions and notifies, as data B, of data A written to said store buffer according to the store instruction in the pair of instructions from said store buffer to the program if the address regions on the memory relating to the pair of instructions coincide with each other, and a store forwarding avoidance mechanism which stops out-of-order execution of the load instruction in the pair of instructions and performs, instead of store forwarding, storing of data A front the store buffer into a memory hierarchy and notifying of data B from the memory hierarchy to the program on the basis of the load instruction in the pair of instructions if the address regions on the memory relating to the pair of instructions do not coincide with each other but overlap each other and
wherein the address regions on the memory relating to the store instruction S and the load instruction L are set to activate said stare forwarding avoidance mechanism; and wherein (b2) and (b3) perform processing on the basis of said setting of the address regions.

20. The apparatus according to claim 18, wherein the store instruction S corresponding to the storage performed by (b2) is set with its address region selected as an address region A1 relating to the storage region in which information indicating that no thread holding the lock on the certain object exists is stored;

wherein the load instruction L corresponding to the read of the bit performed by (b3) is set with its address region selected as an address region A2 containing the entire address region relating to the bit and at least a portion of the address region A1; and wherein (b2) and (b3) perform processing on the basis of said setting of the address regions.

21. The apparatus according to claim 18, wherein each of said CPUs is adapted to:

(b5) enable the first thread to enter a state under exclusive control performed by a mechanism when it is determined that the contention bit is set, the mechanism enabling exclusive control of access to the object and, if a predetermined condition is satisfied, a waiting operation of the thread and a notification operation to the thread in the waiting state;

(b6) execute a notification operation to the thread in the waiting state; and (b7) enable the first thread to exit from the stare under exclusive control.

22. An apparatus which performs lock management with a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, said apparatus managing a lock on an object by preparing, in a storage area provided in correspondence with the object, a field for storing a bit indicating the kind of lock and an identifier for a thread acquiring a lock according to the first kind of lock or an identifier relating to the second kind of lock which is a lock method of managing the thread making access to the object by using a queue, in a situation where a plurality of threads exist, wherein each of said CPUs is adapted to:

(c1) enable a first thread to enter a state under exclusive control performed by a mechanism enabling exclusive control of access to the object and, if a predetermined condition is satisfied, a waiting operation of the thread and a notification operation to the thread in the waiting state;

(c2) determine whether or not the bit indicating the kind of lock on a certain object indicates the first kind of lock;

(c3) set a contention bit when the bit indicating the kind of lock on the certain object indicates the first kind of lock;

(c4) determine after the operation (c3), whether or not the first thread can acquire the first kind of lock on the basis of the contents of the storage area provided in correspondence with the certain object; and (c5) store the bit indicating the second kind of lock and the identifier relating to the second kind of lock in the storage area provided in correspondence with the certain kind of object when the first thread can acquire the first kind of lock, wherein the first thread exits from the state under exclusive control after the completion of necessary processing on the certain object;

wherein address regions on the memory relating to a store instruction S corresponding to the setting of the contention bit made by (c3) and a load instruction L corresponding to read of the contents of the storage area performed by (c4) are set so that the out-of-order execution stop mechanism is activated with respect to the store instruction S and the load instruction L; and wherein (c3) and (c4) perform processing on the basis of setting of the address regions.

23. The apparatus according to claim 22, wherein each CPU has a store buffer for writing data to the memory according to the store instruction of the program;

wherein the out-of-order execution slop mechanism has a store forwarding mechanism which stops out-of-order execution of the load instruction in the pair of instructions and notifies, as data B, of data A written to said store buffer according to the store instruction in the pair of instructions from said store buffer to the program if the address regions on the memory relating to the pair of instructions coincide with each other, and a store forwarding avoidance mechanism which stops out-of-order execution of the load instruction in the pair of instructions and performs, instead of store forwarding, storing of data A from the store buffer into a memory hierarchy and notifying of data B from the memory hierarchy to the program on the basis of the load instruction in the pair of instructions if the address regions on the memory relating to the pair of instructions do not coincide with each other but overlap each other; and wherein the address regions on the memory relating to the store instruction S and the load instruction L are set to activate the store forwarding avoidance mechanism; and wherein (c3) and (c4) perform processing on the basis of said setting of the address regions.

24. The apparatus according to claim 22, wherein the store instruction S corresponding to the setting of the contention bit made by (c3) is set with its address region selected as an address region A1 relating to the contention bit;

wherein the load instruction L corresponding to the read of the contents of the storage area performed by (c4) is set with its address region selected as an address region A2 containing the entire address region of the storage area and at least a portion of the address region A1; and wherein (c3) and (c4) perform processing on the basis of setting of the address regions.

25. A program storage device readable by machine, tangibly embodying a program of instructions executable by the machine to perform a method of memory access serialization in a computer having a plurality of CPUs and a memory shared by the plurality of CPUs, each CPU having an out-of-order execution stop mechanism, in which, if address regions on the memory relating to a pair of a store instruction and a load instruction in preceding and subsequent positions, respectively, in written order of a program executed by each of the CPUs have an overlap therebetween, the out-of-order execution stop mechanism stops out-of-order execution of the load instruction and enables data relating to the store instruction to be observed from the other CPUs before execution of the load instruction, said memory access serialization method including:

a detection step of enabling each CPU to detect the pair of the store instruction and the load instruction, which need to be serialized in a before-after relationship with respect to memory access, which are in the preceding and subsequent positions in written order on the program, and which are placed on the program by being set so that their address regions have an overlap therebetween and respectively include address regions for data which needs to be stored and loaded; and an activation step of activating, with respect to the detected pair of instructions, the out-of-order execution stop mechanism of one of the CPUs executing the program relating to the detected pair of instructions.

26. A program storage device readable by machine, tangibly embodying a program of instructions executable by the machine to perform, method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the store instruction to be observed from other CPUs before execution of the load instruction, said lock management method including managing a lock on an object by preparing, in a storage area provided in correspondence with the object, a field for storing a bit indicating the kind of lock and an identifier for a thread acquiring a lock according to the first kind of lock or an identifier relating to the second kind of lock, in a situation where a plurality of threads exist, said lock management method also including an object acquisition method of enabling a second thread to obtain a lock on a certain object held by a first thread, and a lock release method of enabling the first thread to release the lock from the certain object, said object acquisition method including:

(a1) a step of determining whether or not the bit indicating the kind of lock on the certain object indicates the first kind of lock; and (a2) a stop of setting a contention bit when the first kind of lock is indicated, said lock release method including:

(b1) a stop of determining whether or not the bit indicating the kind of lock indicates the first kind of lock;

(b2) a step of storing, in the storage area, information indicating that no thread holding the lock on the certain object exists;

(b3) a stop of determining whether or not the contention bit is set when the reading of the bit indicating the kind or lock indicates the first kind of lock; and (b4) a step of terminating processing if it is determined that the contention bit is not set, address regions on the memory relating to a store instruction S corresponding to storage in said step (b2) and a load instruction L corresponding to reading of the bit in said step (b3) being set so that the out-of-order execution stop mechanism is activated with respect to the store instruction S and the load instruction L, said steps (b2) and (b3) being executed on the basis of said setting of the address regions.

27. A program storage device readable by machine, tangibly embodying a program of instructions executable by the machine to perform a method of lock management executed by a computer having a plurality of CPUs and a memory shared by the plurality of CPUs, each CPU having an out-of-order execution stop mechanism, in which, if address regions on the memory relating to a pair of a store instruction and a load instruction in preceding and following positions, respectively, in written order of a program executed by each of the CPUs have an overlap therebetween, the out-of-order execution stop mechanism stops out-of-order execution of the load instruction and enables data relating to the stare instruction to be observed from other CPUs before execution of the load instruction, said lock management method including managing a lock on an object by preparing, in a storage area provided in correspondence with the object, a field for storing a bit indicating the kind of lock and an identifier for a thread acquiring a lock according to a first kind of lock or an identifier relating to a second kind of lock which is a lock method of managing the thread making access to the object by using a queue, in a situation where a plurality of threads exist, said lock management method also including:

(c1) a step of enabling a first thread to enter a state under exclusive control performed by a mechanism enabling exclusive control of access to the object and, if a predetermined condition is satisfied, a waiting operation of the thread and a notification operation to the thread in the waiting state;

(c2) a step of determining whether or not the bit indicating the kind of lock on a certain object indicates the first kind of lock;

(c3) a step of setting a contention bit when the bit indicating the kind of lock on the certain object indicates the first kind of lock;

(c4) a step of determining, after said step (c3), whether or not the first thread can acquire the first kind or lock on the basis of the contents of the storage area provided in correspondence with the certain object; and (c5) a step of storing the bit indicating the second kind of lock and the identifier relating to the second kind of lock in the storage area provided in correspondence with the certain kind of object when the first thread can acquire the first kind of lock, the first thread exiting from the state under exclusive control after the completion of necessary processing on the certain object, address regions on the memory relating to a store instruction S corresponding to the setting of the contention bit in said step (c3) and a load instruction L corresponding to read of the contents of the storage area in said step (c4) being set so that the out-of-order execution stop mechanism is activated with respect to the store instruction S and the load instruction L, and said steps (c3) and (c4) being executed on the basis of setting of the address regions.

* * * * *